US009606717B2

(12) United States Patent
Matas

(10) Patent No.: US 9,606,717 B2
(45) Date of Patent: Mar. 28, 2017

(54) CONTENT COMPOSER

(71) Applicant: Michael Matas, San Francisco, CA (US)

(72) Inventor: Michael Matas, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 731 days.

(21) Appl. No.: 13/677,222

(22) Filed: Nov. 14, 2012

(65) Prior Publication Data
US 2014/0137043 A1 May 15, 2014

(51) Int. Cl.
*G06F 3/0488* (2013.01)
*G06F 3/0481* (2013.01)

(52) U.S. Cl.
CPC ................. *G06F 3/0488* (2013.01)

(58) Field of Classification Search
None
See application file for complete search history.

(56) References Cited

U.S. PATENT DOCUMENTS

| 5,422,993 | A | * | 6/1995 | Fleming | ............... G06F 3/04817 345/163 |
|---|---|---|---|---|---|
| 5,430,494 | A | | 7/1995 | Saeger | |
| 5,668,966 | A | | 9/1997 | Ono | |
| 5,692,175 | A | | 11/1997 | Davies | |
| 5,941,626 | A | | 8/1999 | Yamuro | |
| 6,141,018 | A | | 10/2000 | Beri | |
| 6,188,432 | B1 | | 2/2001 | Ejima | |
| 6,252,594 | B1 | | 6/2001 | Xia | |
| 7,109,975 | B2 | | 9/2006 | Fedorak | |
| 7,415,662 | B2 | | 8/2008 | Rothmuller | |
| 7,479,949 | B2 | | 1/2009 | Jobs | |
| 7,555,725 | B2 | | 6/2009 | Abramson | |
| 7,930,646 | B2 | | 4/2011 | De Souza | |
| 8,051,089 | B2 | | 11/2011 | Gargi | |
| 8,176,438 | B2 | | 5/2012 | Zaman | |
| 8,271,907 | B2 | * | 9/2012 | Kim | ..................... G06F 3/0416 345/173 |
| 8,275,394 | B2 | | 9/2012 | Mattila | |
| 8,327,284 | B2 | | 12/2012 | Marusich | |

(Continued)

FOREIGN PATENT DOCUMENTS

| EP | 2 487 603 | 8/2012 |
|---|---|---|
| EP | 2 518 646 | 10/2012 |

(Continued)

OTHER PUBLICATIONS

Non-Final Office Action for U.S. Appl. No. 13/676,658, Feb. 25, 2015.

(Continued)

*Primary Examiner* — Maryam Ipakchi
(74) *Attorney, Agent, or Firm* — Baker Botts L.L.P.

(57) ABSTRACT

In one embodiment, a method includes creating and presenting a first content item for composing by a user; presenting a plurality of icons respectively representing a plurality of content types; in response to the user selecting a specific icon representing a specific content type, presenting a plurality of second content items of the specific content type; and in response to the user selecting a specific second content item, incorporating the specific second content item into the first content item.

20 Claims, 20 Drawing Sheets

(56) References Cited

U.S. PATENT DOCUMENTS

| | | | |
|---|---|---|---|
| 8,327,289 B2 | 12/2012 | Butlin | |
| 8,386,935 B2* | 2/2013 | van Zwol | G06F 3/04817 715/716 |
| 8,442,265 B1 | 5/2013 | Bosworth | |
| 8,456,488 B2 | 6/2013 | Ubillos | |
| 8,504,586 B2 | 8/2013 | Armstrong | |
| 8,584,015 B2 | 11/2013 | Osten | |
| 8,584,027 B2 | 11/2013 | Quennesson | |
| 8,683,377 B2 | 3/2014 | Zuverink | |
| 8,726,142 B2 | 5/2014 | Piantino | |
| 8,745,511 B2 | 6/2014 | Ducharme | |
| 8,799,818 B2 | 8/2014 | Kim | |
| 8,811,771 B2 | 8/2014 | Shechtman | |
| 8,830,270 B2 | 9/2014 | Zaman | |
| 8,843,519 B2 | 9/2014 | Armstrong | |
| 8,898,562 B2 | 11/2014 | Tocchini | |
| 2002/0145620 A1 | 10/2002 | Smith | |
| 2004/0218910 A1 | 11/2004 | Chang | |
| 2005/0091596 A1 | 4/2005 | Anthony | |
| 2005/0210410 A1 | 9/2005 | Ohwa | |
| 2006/0010382 A1 | 1/2006 | Ejiri | |
| 2006/0080621 A1 | 4/2006 | Park | |
| 2006/0095331 A1 | 5/2006 | O'Malley | |
| 2007/0038846 A1 | 2/2007 | Kadambi | |
| 2007/0150913 A1 | 6/2007 | Ando | |
| 2007/0236477 A1 | 10/2007 | Ryu | |
| 2008/0009325 A1 | 1/2008 | Zinn | |
| 2008/0057926 A1* | 3/2008 | Forstall et al. | 455/415 |
| 2008/0098316 A1 | 4/2008 | Declan | |
| 2008/0165153 A1 | 7/2008 | Platzer | |
| 2008/0168349 A1* | 7/2008 | Lamiraux et al. | 715/702 |
| 2008/0168384 A1 | 7/2008 | Platzer | |
| 2008/0282202 A1 | 11/2008 | Sunday | |
| 2008/0294663 A1 | 11/2008 | Heinley | |
| 2008/0307360 A1 | 12/2008 | Chaudhri | |
| 2009/0007017 A1 | 1/2009 | Anzures | |
| 2009/0031232 A1 | 1/2009 | Brezina | |
| 2009/0044133 A1 | 2/2009 | Goto | |
| 2009/0064031 A1 | 3/2009 | Bull | |
| 2009/0064055 A1* | 3/2009 | Chaudhri | G06F 3/04817 715/863 |
| 2009/0106687 A1 | 4/2009 | De Souza | |
| 2009/0132933 A1 | 5/2009 | Faski | |
| 2009/0144392 A1 | 6/2009 | Wang | |
| 2009/0164602 A1 | 6/2009 | Kies | |
| 2009/0198359 A1 | 8/2009 | Chadhri | |
| 2009/0199082 A1 | 8/2009 | Hollander | |
| 2009/0228807 A1 | 9/2009 | Lemay | |
| 2009/0305732 A1 | 12/2009 | Marcellino | |
| 2009/0307623 A1 | 12/2009 | Agarawala | |
| 2009/0325607 A1 | 12/2009 | Conway | |
| 2010/0049534 A1 | 2/2010 | Whitnah | |
| 2010/0058240 A1 | 3/2010 | Bull | |
| 2010/0070628 A1 | 3/2010 | Harrang | |
| 2010/0158315 A1 | 6/2010 | Martin | |
| 2010/0199180 A1 | 8/2010 | Brichter | |
| 2010/0211872 A1 | 8/2010 | Rolston | |
| 2010/0214321 A1 | 8/2010 | Hokkanen | |
| 2010/0313165 A1 | 12/2010 | Louch | |
| 2010/0332958 A1 | 12/2010 | Weinberger | |
| 2011/0010641 A1 | 1/2011 | Wolff | |
| 2011/0083082 A1 | 4/2011 | Gottwald | |
| 2011/0164058 A1 | 7/2011 | Lemay | |
| 2011/0182485 A1 | 7/2011 | Shochat | |
| 2011/0184960 A1 | 7/2011 | Delphia | |
| 2011/0191685 A1 | 8/2011 | Bamford | |
| 2011/0231745 A1 | 9/2011 | Levesque | |
| 2011/0231802 A1 | 9/2011 | Lee | |
| 2011/0238690 A1 | 9/2011 | Arrasvuori | |
| 2012/0010995 A1 | 1/2012 | Skirpa | |
| 2012/0011430 A1 | 1/2012 | Parker | |
| 2012/0023407 A1 | 1/2012 | Taylor | |
| 2012/0023425 A1 | 1/2012 | Hackborn | |
| 2012/0030568 A1 | 2/2012 | Migos | |
| 2012/0030616 A1 | 2/2012 | Howes | |
| 2012/0030636 A1 | 2/2012 | Miyazaki | |
| 2012/0054684 A1 | 3/2012 | Gossweiler | |
| 2012/0072957 A1 | 3/2012 | Cherukuwada | |
| 2012/0096393 A1 | 4/2012 | Shim | |
| 2012/0110474 A1 | 5/2012 | Chen | |
| 2012/0131508 A1 | 5/2012 | Lee | |
| 2012/0143701 A1 | 6/2012 | Reis | |
| 2012/0147055 A1 | 6/2012 | Pallakoff | |
| 2012/0154444 A1 | 6/2012 | Fernandez | |
| 2012/0159635 A1 | 6/2012 | He | |
| 2012/0169774 A1 | 7/2012 | Yu | |
| 2012/0173994 A1 | 7/2012 | Ho | |
| 2012/0179969 A1 | 7/2012 | Lee | |
| 2012/0223951 A1 | 9/2012 | Dunn | |
| 2012/0240071 A1* | 9/2012 | Park | G06F 3/0488 715/769 |
| 2012/0314912 A1 | 12/2012 | Nakagomi | |
| 2012/0331053 A1 | 12/2012 | Dunn | |
| 2013/0073970 A1 | 3/2013 | Piantino | |
| 2013/0080881 A1 | 3/2013 | Goodspeed | |
| 2013/0095857 A1 | 4/2013 | Garcia | |
| 2013/0139111 A1 | 5/2013 | Grimes | |
| 2013/0179504 A1 | 7/2013 | Adams | |
| 2013/0187944 A1 | 7/2013 | Hamana | |
| 2013/0191711 A1 | 7/2013 | Tashman | |
| 2013/0326398 A1 | 12/2013 | Zuverink | |
| 2013/0332068 A1 | 12/2013 | Kesar | |
| 2014/0040774 A1 | 2/2014 | Charytoniuk | |
| 2014/0123021 A1 | 5/2014 | Walkin | |
| 2014/0132638 A1 | 5/2014 | Matas | |
| 2014/0136946 A1 | 5/2014 | Matas | |
| 2014/0136959 A1 | 5/2014 | Matas | |
| 2014/0136968 A1 | 5/2014 | Matas | |
| 2014/0136995 A1 | 5/2014 | Matas | |
| 2014/0137010 A1 | 5/2014 | Matas | |
| 2014/0137011 A1 | 5/2014 | Matas | |
| 2014/0137012 A1 | 5/2014 | Matas | |
| 2014/0137013 A1 | 5/2014 | Matas | |
| 2014/0137026 A1 | 5/2014 | Matas | |
| 2014/0137030 A1 | 5/2014 | Matas | |
| 2014/0137046 A1 | 5/2014 | Matas | |
| 2014/0344471 A1 | 11/2014 | Valko | |
| 2014/0344716 A1 | 11/2014 | Martin | |

FOREIGN PATENT DOCUMENTS

| | | |
|---|---|---|
| KR | 10-2001-0013878 | 2/2001 |
| KR | 10-2004-0073180 | 8/2004 |
| KR | 10-2012-0048522 | 5/2012 |
| WO | 2010/040201 | 4/2010 |
| WO | 2012/001637 | 1/2012 |
| WO | 2012/125426 | 9/2012 |
| WO | 2012/129336 | 9/2012 |

OTHER PUBLICATIONS

Non-Final Office Action for U.S. Appl. No. 13/676,831, Mar. 4, 2015.
Final Office Action for U.S. Appl. No. 13/663,229, Jan. 26, 2015.
Response to Non-Final Office Action for U.S. Appl. No. 13/663,229, Oct. 3, 2014.
Non-Final Office Action for U.S. Appl. No. 13/663,229, Jun. 3, 2014.
Response to Final Office Action for U.S. Appl. No. 13/663,229, Mar. 25, 2014.
Supplemental Response for U.S. Appl. No. 13/663,229, Mar. 20, 2014.
Final Office Action for U.S. Appl. No. 13/663,229, Sep. 25, 2013.
Response to Non-Final Office Action for U.S. Appl. No. 13/663,229, Aug. 12, 2013.
Non-Final Office Action for U.S. Appl. No. 13/663,229, Mar. 12, 2013.
Response to Non-Final Office Action for U.S. Appl. No. 13/677,002, Dec. 29, 2014.
Non-Final Office Action for U.S. Appl. No. 13/677,002, Jan. 6, 2014.

(56) References Cited

OTHER PUBLICATIONS

Response to Final Office Action for U.S. Appl. No. 13/677,002, Oct. 3, 2014.
Final Office Action for U.S. Appl. No. 13/677,002, May 22, 2014.
Response to Non-Final Office Action for U.S. Appl. No. 13/677,002, Feb. 6, 2014.
Non-Final Office Action for U.S. Appl. No. 13/677,002, Nov. 6, 2013.
Response to Non-Final Office Action for U.S. Appl. No. 13/677,056, Mar. 20, 2015.
Non-Final Office Action for U.S. Appl. No. 13/677,056, Dec. 12, 2014.
Notice of Allowance for U.S. Appl. No. 13/676,951, Mar. 5, 2015.
Response to Final Office Action for U.S. Appl. No. 13/676,951, Feb. 12, 2015.
Final Office Action for U.S. Appl. No. 13/676,951, Feb. 23, 2014.
Response to Non-Final Office Action for U.S. Appl. No. 13/676,951, Nov. 6, 2014.
Non-Final Office Action for U.S. Appl. No. 13/676,951, Aug. 5, 2014.
Response to Final Office Action for U.S. Appl. No. 13/676,951, Apr. 4, 2014.
Final Office Action for U.S. Appl. No. 13/676,951, Dec. 4, 2013.
Response to Non-Final Office Action for U.S. Appl. No. 13/676,951, Sep. 18, 2013.
Non-Final Office Action for U.S. Appl. No. 13/676,951, Apr. 18, 2013.
Response to Non-Final Office Action for U.S. Appl. No. 13/677,104, Feb. 12, 2015.
Non-Final Office Action for U.S. Appl. No. 13/677,104, Dec. 10, 2014.
Response to Non-Final Office Action for U.S. Appl. No. 13/677,266, Mar. 20, 2015.
Non-Final Office Action for U.S. Appl. No. 13/677,266, Dec. 22, 2014.
Non-Final Office Action for U.S. Appl. No. 13/677,269, Mar. 13, 2015.
Non-Final Office Action for U.S. Appl. No. 13/677,247, Mar. 3, 2015.
Response to Non-Final Office Action for U.S. Appl. No. 13/677,274, Dec. 22, 2014.
Non-Final Office Action for U.S. Appl. No. 13/677,274, Dec. 22, 2014.
International Search Report and Written Opinion for International Applications No. PCT/US2013/067226, Feb. 10, 2014.
International Search Report and Written Opinion for International Applications No. PCT/US2013/067482, Feb. 19, 2014.
International Search Report and Written Opinion for International Applications No. PCT/US2013/067650, Feb. 19, 2014.
International Search Report and Written Opinion for International Applications No. PCT/US2013/068294, Feb. 26, 2014.
International Search Report and Written Opinion for International Applications No. PCT/US2013/067925, Feb. 19, 2014.
International Search Report and Written Opinion for International Applications No. PCT/US2013/068303, Feb. 13, 2015.
International Search Report and Written Opinion for International Applications No. PCT/US2013/068308, Feb. 13, 2014.
International Search Report for International Applications No. PCT/US2013/066289, Feb. 3, 2014.
"Ken Burns Effect," Wikipedia, http://en.wikipedia.org/w/index.php?title=Ken_Burns_effect&printable=yes (downloaded Sep. 18, 2012), Nov. 14, 2012.
White, Panning and Zooming in Premiere Pro CS5, Dec. 10, 2010, http://www.youtube.com/watch?v=_Okt60VAyb8, Mar. 4, 2015.

\* cited by examiner

210

CONTENT COMPOSER

TECHNICAL FIELD

This disclosure generally relates to a user interface.

BACKGROUND

A user interface (UI), in the industrial design field of human-machine interaction, is the space where interactions between humans and machines occur. The goal of the interactions between a human, often referred to as a "user", and a machine at the user interface is the user's control of the machine and its operations (e.g., through user input) and machine feedback (e.g., through program output). A graphical user interface (GUI) is a type of user interface that allows users to interact with software applications executing on electronic or computing devices through multimedia objects (e.g., images, videos, audios, etc.) rather than purely text commands.

SUMMARY OF PARTICULAR EMBODIMENTS

In particular embodiments, a user interface for presenting content to users may have a hierarchical structure. The user interface may have any number of content sections, and each content section may have any number of content items. The content items may be of any type or format. A user may consume or interact with some of the content items. In particular embodiments, each content item may correspond to a user-interface element.

In particular embodiments, a composer tool enables a user to compose a content item (e.g., a post for publishing to the user's wall). The composer tool allows the user to drag and drop content into the content item. For example, the user may incorporate another user, a geographical location, or an image to the content item under composition, all through a graphical user interface including various icons.

The composer tool displays the content item under composition as it would appear as a final product (e.g., when the post is published) so that the user can preview it. The composer tool may also automatically adjust the layout of the content item under composition based on the display area or the specific content incorporated in the content item thus far.

DESCRIPTION OF EXAMPLE EMBODIMENTS

A user interface (UI) may be incorporated into any type of software applications, including, for example, desktop applications, mobile applications, or web-based applications, to enable users to interact with and control the applications. A graphical user interface (GUI) is a type of user interface that enables users to interact with software applications through multimedia objects, including, for example, icons, buttons, menus, images, video, or audios.

Figure 1:
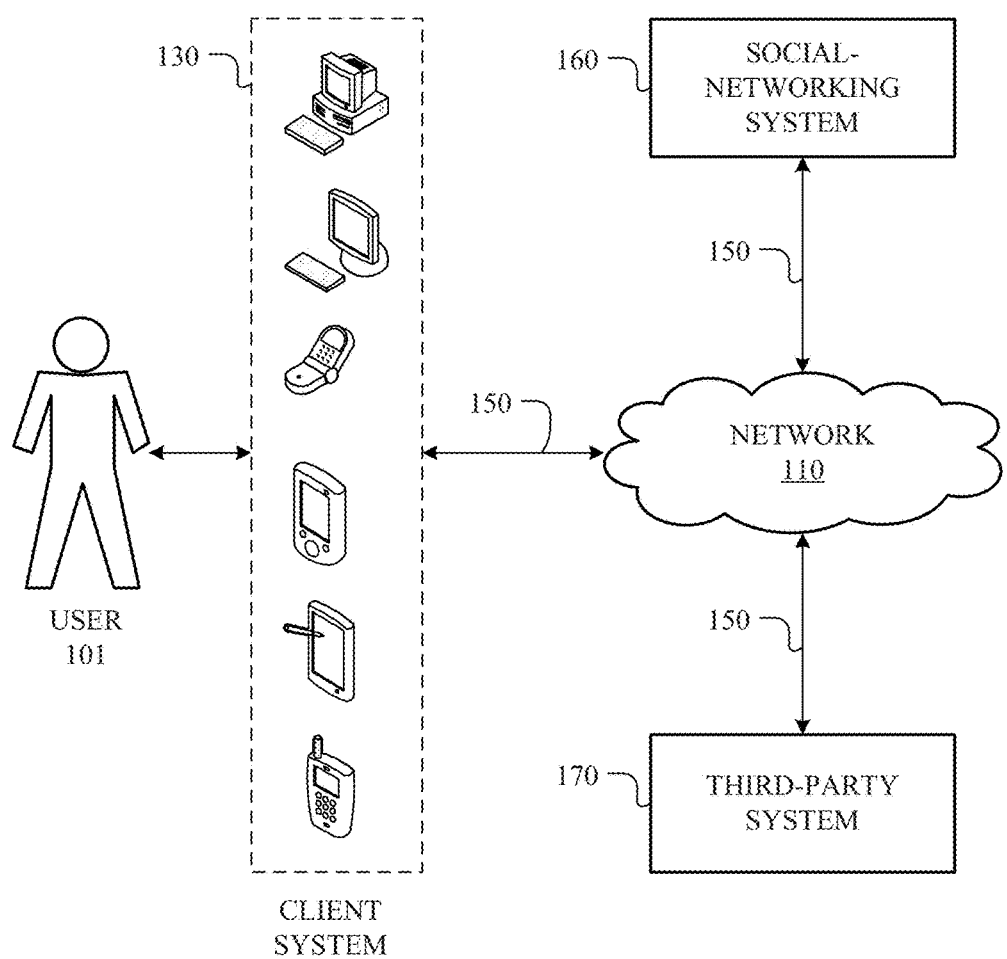
FIG. 1 illustrates an example network environment associated with a social-networking system.

In particular embodiments, a software application may be associated with a social-networking system. FIG. 1 illustrates an example network environment 100 associated with a social-networking system. Network environment 100 includes a user 101, a client system 130, a social-networking system 160, and a third-party system 170 connected to each other by a network 110. Although FIG. 1 illustrates a particular arrangement of user 101, client system 130, social-networking system 160, third-party system 170, and network 110, this disclosure contemplates any suitable arrangement of user 101, client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of users 101, client systems 130, social-networking systems 160, third-party systems 170, and networks 110, this disclosure contemplates any suitable number of users 101, client systems 130, social-networking systems 160, third-party systems 170, and networks 110. As an example and not by way of limitation, network environment 100 may include multiple users 101, client system 130, social-networking systems 160, third-party systems 170, and networks 110.

In particular embodiments, user 101 may be an individual (human user), an entity (e.g., an enterprise, business, or third-party application), or a group (e.g., of individuals or entities) that interacts or communicates with or over social-networking system 160. In particular embodiments, social-networking system 160 may be a network-addressable computing system hosting an online social network. Social-networking system 160 may generate, store, receive, and transmit social-networking data, such as, for example, user-profile data, concept-profile data, social-graph information, or other suitable data related to the online social network. Social-networking system 160 may be accessed by the other components of network environment 100 either directly or via network 110. In particular embodiments, social-networking system 160 may include an authorization server that allows users 101 to opt in or opt out of having their actions logged by social-networking system 160 or shared with other systems (e.g., third-party systems 170), such as, for example, by setting appropriate privacy settings. In particular embodiments, third-party system 170 may be a network-addressable computing system that can host various third-party software applications (e.g., web-based applications). Third-party system 170 may generate, store, receive, and transmit various types of data, such as, for example, texts, images, videos, or audios. Third-party system 170 may be accessed by the other components of network environment 100 either directly or via a network 110. In particular embodiments, one or more users 101 may use one or more client systems 130 to access, send data to, and receive data from social-networking system 160 or third-party system 170. Client system 130 may access social-networking system 160 or third-party system 170 directly, via network 110, or via a third-party system. As an example and not by way of limitation, client system 130 may access third-party system 170 via social-networking system 160. Client system 130 may be any suitable computing device, such as, for example, a personal computer, a laptop computer, a cellular telephone, a smartphone, or a tablet computer.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, data (e.g., data representing various types of information or content) may be sent between servers associated with social-networking system 160 and individual client systems 130 via network 110. When two electronic devices (e.g., a server and a client) are connected to a network (e.g., a computer or communications network, such as network 110), data may be transmitted between the two devices over the network using one or more suitable network protocols. A network may include any number of sub-networks. By transmitting data between the two devices, the two devices may communicate with each other.

In network communications, there are two ways to send a communication (i.e., data) from one device to another device: push and pull. With push technology, the request for the communication transaction is initiated by the sending device. That is, the sending device "pushes" the communication, so to speak, to the receiving device. In this case, the sending device may be considered the active party and the receiving device may be considered the passive party in the transaction. In contrast, with pull technology, the request for the communication transaction is initiated by the receiving device. That is, the receiving device "pulls" the communication, so to speak, from the sending device. In this case, the sending device may be considered the passive party and the receiving device may be considered the active party in the transaction. In particular embodiments, a server associated with social-networking system 160 may push data to a client system 130. A communication pushed from a server to a client may be referred to as a "push notification". Similarly, a client system 130 may push data to a server associated with social-networking system 160.

In particular embodiments, a client system 130 may be a mobile electronic or computing device. A mobile electronic device—such as a Smartphone, tablet computer, or laptop computer—may include functionality for determining its location, direction, or orientation, such as a GPS receiver, compass, or gyroscope. Such a mobile device may also include functionality for wireless communication, such as BLUETOOTH communication, near-field communication (NFC), or infrared (IR) communication or communication with a wireless local area networks (WLANs) or cellular-telephone network. Such a mobile device may also include one or more cameras, scanners, touchscreens, microphones, or speakers. Mobile electronic devices may also execute software applications, such as games, web browsers, or social-networking applications. With social-networking applications, users may connect, communicate, and share information with other users in their social networks.

Figure 2A:
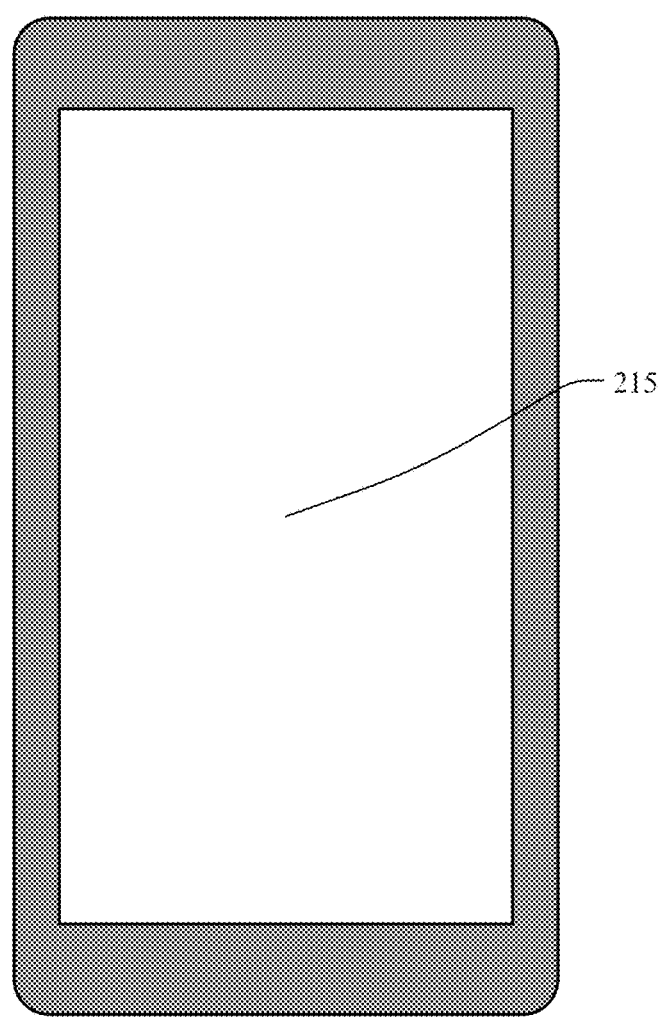
FIGS. 2A and 2B illustrate two example mobile electronic devices.

In particular embodiments, a mobile electronic device (e.g., Smartphone or tablet computer) may include a touchscreen capable of receiving touch input. FIG. 2A illustrates an example mobile electronic device 210 (e.g., a Smartphone) having a touchscreen 215. Touchscreen 215 may incorporate one or more touch sensors and a touch-sensor controller for detecting the presence and location of a touch (e.g., from a user's finger) or the proximity of an object (e.g., a stylus). In particular embodiments, a specific touch detected via touchscreen 215 may result in a touch input event.

Figure 2B:
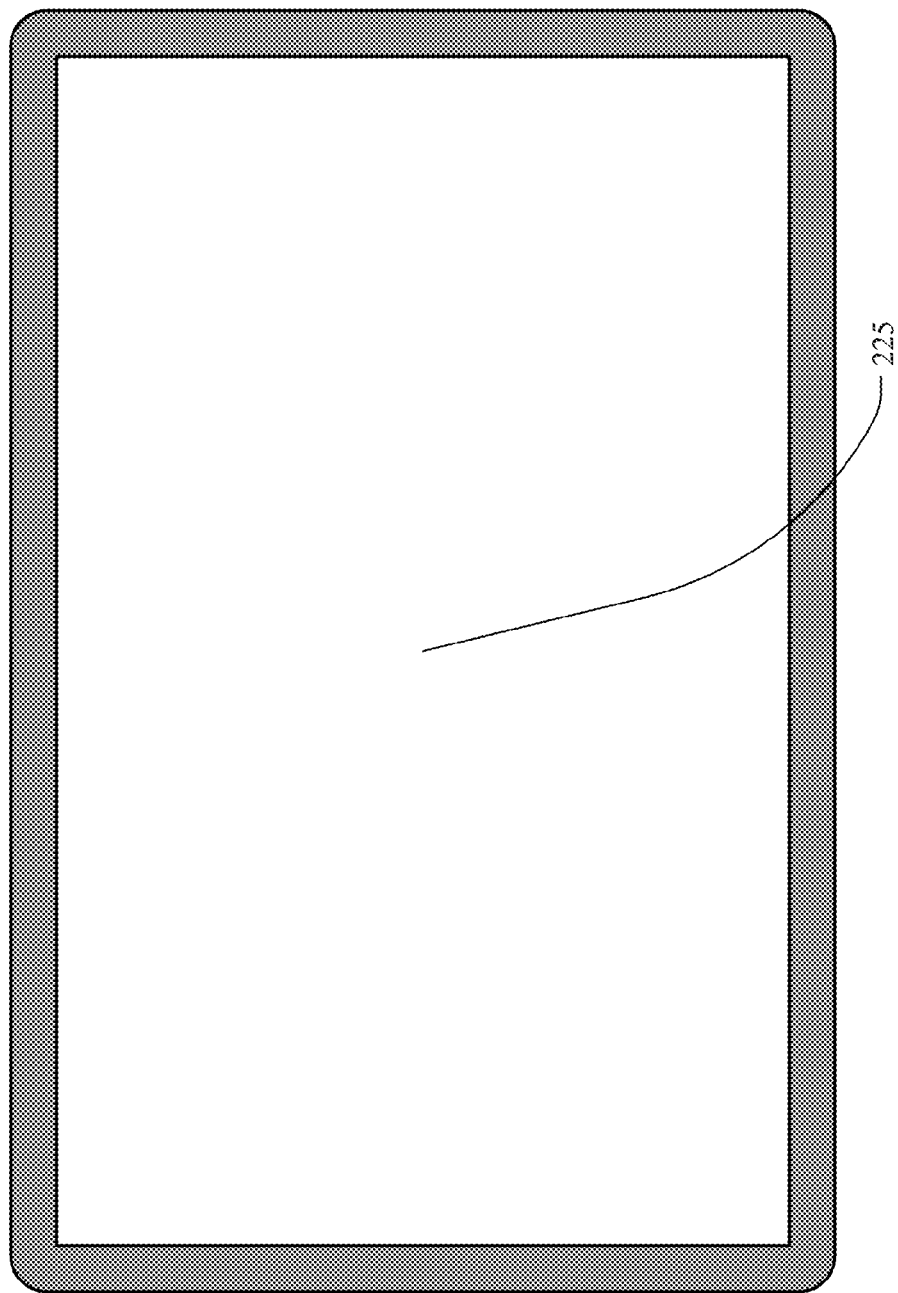

Different mobile electronic devices may have different designs. As a result, the size, shape, or aspect ration of the touchscreens of different mobile devices may differ. FIG. 2B illustrates another example mobile electronic device 220 (e.g., a tablet computer) having a touchscreen 225. Similarly, touchscreen 225 may incorporate one or more touch sensors and a touch-sensor controller for detecting the presence and location of a touch (e.g., from a user's finger) or the proximity of an object (e.g., a stylus). A specific touch detected via touchscreen 225 may result in a touch input event. However, since mobile electronic devices 210 and 220 are two different types of devices, their respective touchscreen 215 and 225 have different sizes and aspect ratios.

There may be various types of touches or gestures, such as single tap, double tap, short press, long press, slide, swipe, flip, pinch open, or pinch close, corresponding to various types of touch input events. Different touch input events may result in different responses and this disclosure contemplates any applicable gesture.

Social-networking system 160 may store various types of data including, for example, user data, application data, or social data. In particular embodiments, such data may be stored in a graph having any number of nodes and edges, where each edge connects two nodes. The graph is often referred to as a "social graph" or "open graph" as it contains, among others, social information.

Figure 3:
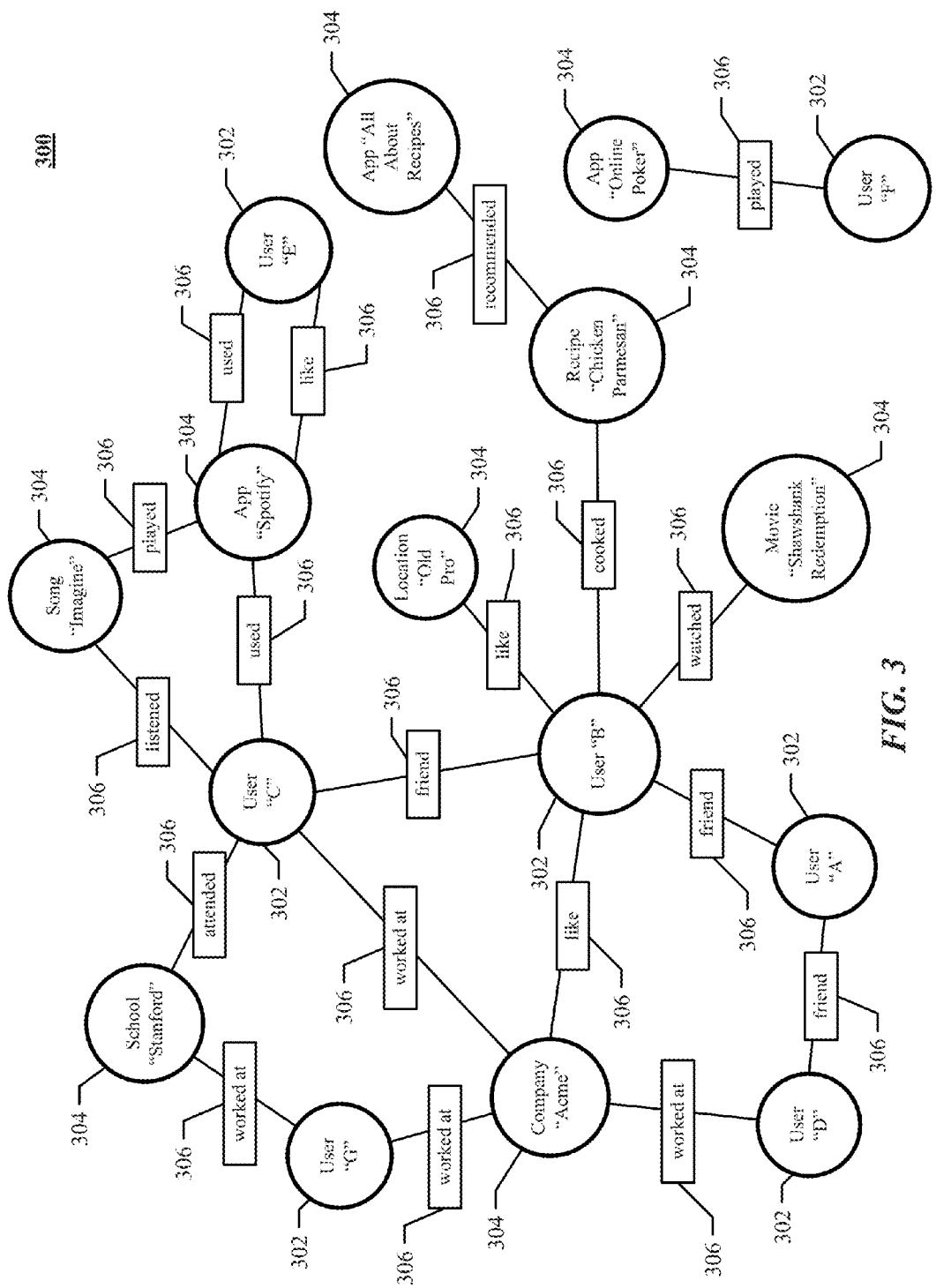
FIG. 3 illustrates an example social graph.

FIG. 3 illustrates example social graph 300. In particular embodiments, social-networking system 160 may store one or more social graphs 300 in one or more data stores. In particular embodiments, social graph 300 may include multiple nodes—which may include multiple user nodes 302 or multiple concept nodes 304—and multiple edges 306 connecting the nodes. Example social graph 300 illustrated in FIG. 3 is shown, for didactic purposes, in a two-dimensional visual map representation. In particular embodiments, a social-networking system 160, client system 130, or third-party system 170 may access social graph 300 and related social-graph information for suitable applications. The nodes and edges of social graph 300 may be stored as data objects, for example, in a data store (such as a social-graph database). Such a data store may include one or more searchable or queryable indexes of nodes or edges of social graph 300.

In particular embodiments, a user node 302 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 302 corresponding to the user, and store the user node 302 in one or more data stores. Users and user nodes 302 described herein may, where appropriate, refer to registered users and user nodes 302 associated with registered users. In addition or as an alternative, users and user nodes 302 described herein may, where appropriate, refer to users that have not registered with social-networking system 160. In particular embodiments, a user node 302 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 302 may be associated with one or more data objects corresponding to information associated with a user. In particular embodiments, a user node 302 may correspond to one or more webpages.

In particular embodiments, a concept node 304 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 304 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 304 may be associated with one or more data objects corresponding to information associated with concept node 304. In particular embodiments, a concept node 304 may correspond to one or more webpages.

In particular embodiments, a node in social graph 300 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 304. Profile pages may be viewable by all or a selected subset of other users. As an example and not by way of limitation, a user node 302 may have a corresponding user-profile page in which the corresponding user may add content, make declarations, or otherwise express himself or herself. As another example and not by way of limitation, a concept node 304 may have a corresponding concept-profile page in which one or more users may add content, make declarations, or express themselves, particularly in relation to the concept corresponding to concept node 304.

In particular embodiments, a concept node 304 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system 130 to transmit to social-networking system 160 a message indicating the user's action. In response to the message, social-networking system 160 may create an edge (e.g., an "eat" edge) between a user node 302 corresponding to the user and a concept node 304 corresponding to the third-party webpage or resource and store edge 306 in one or more data stores.

In particular embodiments, a pair of nodes in social graph 300 may be connected to each other by one or more edges 306. An edge 306 connecting a pair of nodes may represent a relationship between the pair of nodes. In particular embodiments, an edge 306 may include or represent one or more data objects or attributes corresponding to the relationship between a pair of nodes. As an example and not by way of limitation, a first user may indicate that a second user is a "friend" of the first user. In response to this indication, social-networking system 160 may transmit a "friend request" to the second user. If the second user confirms the "friend request," social-networking system 160 may create an edge 306 connecting the first user's user node 302 to the second user's user node 302 in social graph 300 and store edge 306 as social-graph information in one or more of data stores (e.g., data stores associated with social-networking system 160). In the example of FIG. 3, social graph 300 includes an edge 306 indicating a friend relation between user nodes 302 of user "A" and user "B" and an edge indicating a friend relation between user nodes 302 of user "C" and user "B." Although this disclosure describes or illustrates particular edges 306 with particular attributes connecting particular user nodes 302, this disclosure contemplates any suitable edges 306 with any suitable attributes connecting user nodes 302. As an example and not by way of limitation, an edge 306 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 300 by one or more edges 306.

In particular embodiments, an edge 306 between a user node 302 and a concept node 304 may represent a particular action or activity performed by a user associated with user node 302 toward a concept associated with a concept node 304. As an example and not by way of limitation, as illustrated in FIG. 3, a user may "like," "attended," "played," "listened," "cooked," "worked at," or "watched" a concept, each of which may correspond to a edge type or subtype. A concept-profile page corresponding to a concept node 304 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Ramble On") using a particular application (SPOTIFY, which is an online music application). In this case, social-networking system 160 may create a "listened" edge 306 and a "used" edge (as illustrated in FIG. 3) between user nodes 302 corresponding to the user and concept nodes 304 corresponding to the song and application to indicate that the user listened to the song and used the application. Moreover, social-networking system 160 may create a "played" edge 306 (as illustrated in FIG. 3) between concept nodes 304 corresponding to the song and the application to indicate that the particular song was played by the particular application. In this case, "played" edge 306 corresponds to an action performed by an external application (SPOTIFY) on an external audio file (the song "Imagine"). Although this disclosure describes particular edges 306 with particular attributes connecting user nodes 302 and concept nodes 304, this disclosure contemplates any suitable edges 306 with any suitable attributes connecting user nodes 302 and concept nodes 304. Moreover, although this disclosure describes edges between a user node 302 and a concept node 304 representing a single relationship, this disclosure contemplates edges between a user node 302 and a concept node 304 representing one or more relationships. As an example and not by way of limitation, an edge 306 may represent both that a user likes and has used at a particular concept. Alternatively, another edge 306 may represent each type of relationship (or multiples of a single relationship) between a user node 302 and a concept node 304 (as illustrated in FIG. 3 between user node 302 for user "E" and concept node 304 for "SPOTIFY").

In particular embodiments, social-networking system 160 may create an edge 306 between a user node 302 and a concept node 304 in social graph 300. As an example and not by way of limitation, a user viewing a concept-profile page (such as, for example, by using a web browser or a special-purpose application hosted by the user's client system 130) may indicate that he or she likes the concept represented by the concept node 304 by clicking or selecting a "Like" icon, which may cause the user's client system 130 to transmit to social-networking system 160 a message indicating the user's liking of the concept associated with the concept-profile page. In response to the message, social-networking system 160 may create an edge 306 between user node 302 associated with the user and concept node 304, as illustrated by "like" edge 306 between the user and concept node 304. In particular embodiments, social-networking system 160 may store an edge 306 in one or more data stores. In particular embodiments, an edge 306 may be automatically formed by social-networking system 160 in response to a particular user action. As an example and not by way of limitation, if a first user uploads a picture, watches a movie, or listens to a song, an edge 306 may be formed between user node 302 corresponding to the first user and concept nodes 304 corresponding to those concepts. Although this disclosure describes forming particular edges 306 in particular manners, this disclosure contemplates forming any suitable edges 306 in any suitable manner.

In particular embodiments, a set of objects may be organized into a hierarchy based on, for example, how the individual objects are related to each other. An object hierarchy may have any number of levels, and at each level, there may be any number of objects. Parent-child or sibling relationships may exist between specific objects in the hierarchy. Within an object hierarchy, a parent object is one level above the level of its child objects. Two sibling objects are at the same level and share the same parent object. In addition, any portion of the hierarchy may also be considered a hierarchy in itself.

Figure 4:
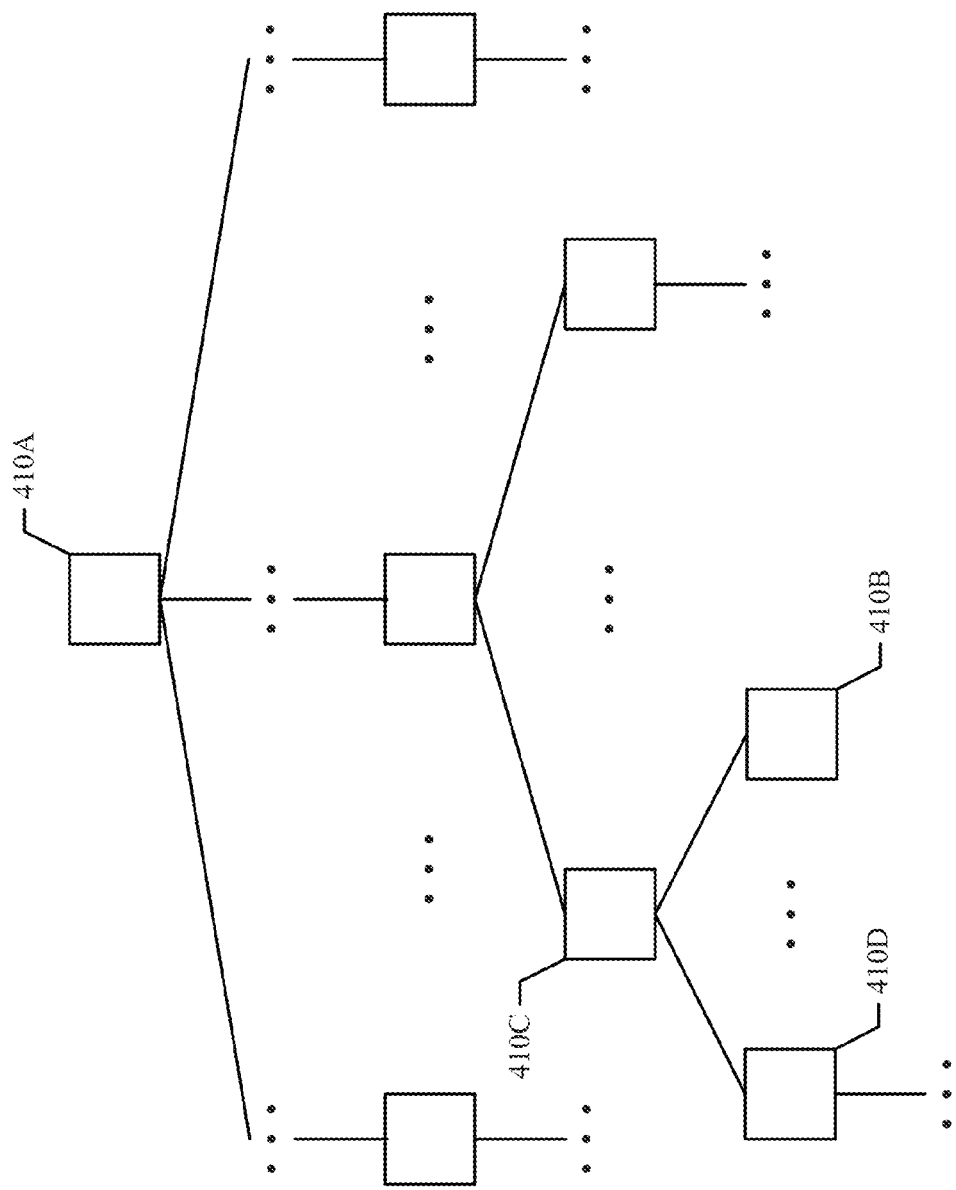
FIG. 4 illustrates an example object hierarchy.

FIG. 4 illustrates a portion of an example object hierarchy 400 that includes a number of objects 410. FIG. 4 is in fact a visual representation of an object hierarchy. Each node represents a specific object in the hierarchy, and each edge connecting two nodes represents a parent-child relationship between the two corresponding objects.

In particular embodiments, an object in a hierarchy may or may not have a parent. If an object does not have a parent, it may be referred to as a "root" object (e.g., object 410A). Typically, the root object is positioned at the first or topmost level of the hierarchy. In particular embodiments, an object in a hierarchy may or may not have any children. If an object does not have any children, it may be referred to as a "leaf" or "terminal" object (e.g., object 410B). If an object does have children (e.g., object 410C), it may have any number of children. In addition, objects sharing the same parent may be referred to as each other's "siblings". For example, in FIG. 4, object 410C is the parent of objects 410D and 410B. Objects 410D and 410B are the children of object 410C and are siblings to each other. Thus, a hierarchy of objects (e.g., object hierarchy 400) not only includes the individual objects (e.g., objects 410) themselves but also indicates the relationships among the specific objects. Moreover, the position of a specific object within the hierarchy may indicate its relationships with other objects in the hierarchy.

Objects 410 may be of various types, and this disclosure contemplates any applicable object types. For example and without limitation, the term "object" may refer to any type of content, including but not limited to images, videos, captions, text blocks or boxes, user-interface elements, clickable links, newsfeed stories, references to other objects, advertisements, calendar events, units for displaying open graph analysis that may be graphically rendered, applications, websites, web pages, books, chapters. In particular embodiments, given a hierarchy of objects, which may be a portion of another, larger hierarchy of objects, the hierarchical relationships (e.g., parent-child or sibling relationships, positions of the objects within the hierarchy) between specific objects may direct some aspects of how these objects behave in the context of a user interface or how the objects are presented to a user.

As an example, in the context of the desktop of a computing device, the desktop may be a parent object, and sometimes the root object of a hierarchy, whose child objects are the individual software applications available on the desktop. A software application, while itself being one of the child objects of the desktop, is also the parent object of the individual components of that software application. Different software applications may include different components. For example, for a software application that manages digital books (e.g., a book reader application), its components may include the digital books available, the individual chapters of each book, the pages of each chapter, and the texts, images, videos, audios, or other content or media elements on each page. Each of these also corresponds to an object (e.g., user-interface component) in the hierarchy. More specifically, within the hierarchy, the digital book application may be the parent object of the digital books. A digital book may be the parent object of the individual chapters of that book. A chapter, while itself being one of the child objects of the book, is also the parent object of the pages in that chapter. A page is the parent object of the texts, images, videos, audios, or other content or media elements on that page. A text block, image, video, audio, or other content or media element is one of the child objects of the page to which it belongs. Similarly, for a software application that manages news feeds, its components may include the individual news channels and the news stories within each channel. Each of these may correspond to an object. Within the hierarchy, the news-feed application, while itself being one of the child objects of the desktop, is also the parent object of the news channels. A news channel in turn is the parent object of the news stories included in that channel.

As another example, in the context of the Internet or the World Wide Web, the Internet may be a parent object whose child objects are the individual websites. A website, while itself being one of the child objects of the Internet, is also the parent object of the individual web pages of that website. A web page, while itself being one of the child objects of the website to which it belongs, is the parent object of the texts, images, videos, audios, or links (e.g., Uniform Resource Locators (URLs)) included in the web page. Each text block, image, video, audio, or link may also correspond to a specific object in the hierarchy.

As a third example, a website, such as a social-networking website implemented by social-networking system 160, may also be arranged in a hierarchical structure for navigating the content of the social-networking website. In this context, the social-networking website may be a parent object whose child objects are the components (e.g., photo albums, user profile pages, etc.) of the website. For example, a photo album, while itself being a child object of the social-networking website, may in turn be a parent object, and the individual photos within the album may be the child objects of the photo album. A user's profile page may be structured in such a hierarchical fashion as well. The profile page itself may be considered a parent object, and the individual objects on the profile page may be the child objects of the profile page. In particular embodiments, a profile page may be considered and rendered (e.g., for presentation to a user) as a linear timeline of objects, such as, for example and without limitation, photos, photo albums, check-ins, comments from other users, attended events, tags, applications the user has added to the profile page, stories, songs the user has listened to, playlists. These various types of objects may all be children of the profile page, or may be further arranged into multiple levels. With some implementations, a user's profile page may include any number of sections, such as the user's education and employment information, the user's public "wall", or the user's social connections. Then the various types of objects above may be divided into specific sections.

In particular embodiments, an object 410 may be a component of a user interface. In this case, object hierarchy 400 may correspond to the user interface, and each object 410 may correspond to a specific component of the user-interface. A user interface may have various types of components, and this disclosure contemplates any applicable user-interface component types. For example, a user-interface component (i.e., an object 410) may be a window, a section, a tab, an image, a video, an audio, a text block, a menu, an icon, a button, a checkbox, a website, a web page, a frame, a clickable link, a message, a post, or an input field. In particular embodiments, an object 410 may be consumed by a user if the user is able to, for example and without limitation, interact with, view, read, listen to, manipulate, or handle the object 410. For example, some user-consumable objects 410 may be texts, images, videos, audios, feeds, executables (e.g., application programs or games), websites, web pages, digital books, photo albums, posts, or messages.

In particular embodiments, when the user interface corresponding to object hierarchy 400 is displayed (e.g., on a client system 130), the structure of the corresponding object hierarchy 400 may reflect the structure of the user interface. The relationships among the individual components in the user interface, as reflected in object hierarchy 400, may influence how these components are organized and presented to users. The user interface may have any number of layers, respectively corresponding to the individual levels of object hierarchy 400. Objects 410 (e.g., user-interface components) at a specific level of object hierarchy 400 are displayed in the corresponding layer of the user interface. With some implementations, the lowest or bottommost layer of the user interface corresponds to the first or topmost level of object hierarchy 400. Thus, root object 410A is displayed in the lowest layer of the user interface. Furthermore, in the user interface, each object 410 (e.g., user-interface component) is displayed in a layer immediately above the layer where its parent, if one exists, is displayed and immediately below the layer where its children, if any, are displayed. Sibling objects 410 are displayed at the same layer. Thus, the position of a component in the user interface indicates its relationships (e.g., parent-child or sibling) with other components in the user interface.

In particular embodiments, a user-interface component (e.g., an image, a video, a folder, etc.) may be displayed in various display modes. As an example, the user-interface component may be displayed in a "full-screen" mode, where the user-interface component occupies the entire or nearly the entire display area (e.g., the screen of an electronic device). As another example, the user-interface component may be displayed in an "on-page" mode, where the user-interface component is included in another user-interface component and displayed as a part of that other user-interface component (e.g., an image is displayed as a part of a web page). As a third example, the user-interface component may be displayed in an "index" mode, where the user-interface component is a part of a series of user-interface components (e.g., an image is displayed together with other images from the same album, or a chapter of a book is displayed in the table of content of the book together with other chapters from the same book).

In particular embodiments, a hierarchical user interface may be used to present content to a user. Such a user interface may be referred to as a "content feed" or "news feed" user interface. The content may be of any type and format, such as, for example and without limitation, text, icon, image, video, audio, web page, post, or message. This disclosure contemplates any applicable content type and format. In particular embodiments, the individual content items (e.g., text, image, video, audio, web page, post, message, news piece, etc.) may be organized into various categories, referred to as content sections. For example, related content items may be categorized into the same content section. The user interface may include any number of content sections, and each content section may include any number of content items. Hierarchically, a content section may be the parent of the content items belonging to that section. For example, various photos taken during a holiday trip may be organized into the same album, and various photo albums may be organized into the photo section of the user interface.

In particular embodiments, a user may consume or interact with a specific content item. For example, a user consumes a content item when the user scrolls, opens up, views, listens to, selects, reviews, or comments on the content item. A user interacts with a content item when the user selects, clicks on, taps, reviews, or comments on the content item. This disclosure contemplates any applicable means for a user to consume or interact with a content item.

In particular embodiments, within a hierarchical user interface, a content section may include any number of content items. Here, the content section is the parent of the content items. A first content section may also include any number of second content sections. Here, the first content section is the parent of the second content sections. Similarly, a first content item may include any number of second content items (e.g., of various content types). Here, the first content item is the parent of the second content items. There may be any number of such nesting levels, thus resulting in a hierarchical structure.

In particular embodiments, a content-item composing tool, or "content composer" for short, enables a user to compose or construct a specific content item. For example, the user may use the content composer to compose a post to be published to the user's wall at social-networking system 160. The content composer may include a graphical user interface that helps the user add or remove specific content to or from the content item under composition.

Figure 5:
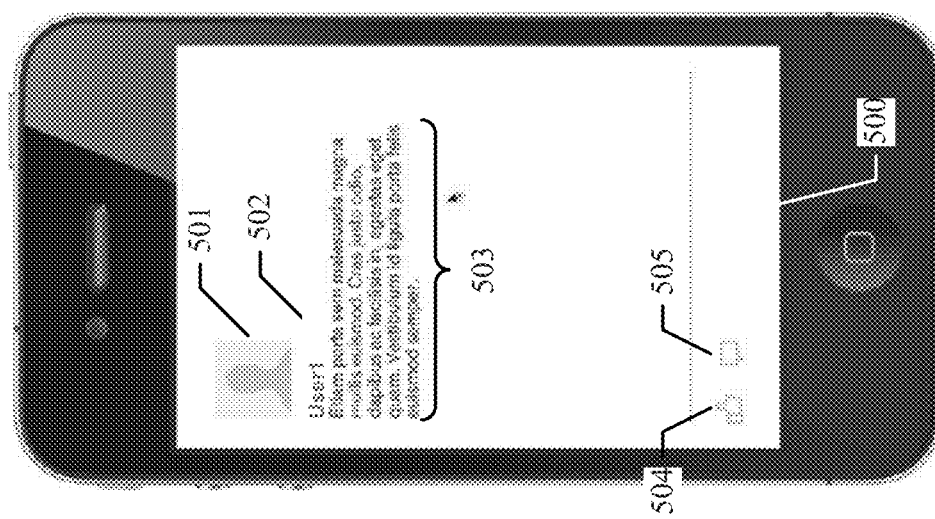
FIG. 5 illustrates an example post.

FIG. 5 illustrates an example content item 500, specifically, an example post. As indicated above, a content item may include other content items. In this example, post 500 includes a thumbnail image 501 and the name 502 of the user who has composed and published post 500 (i.e., the user who owns post 500). Post 500 also includes a text message 503, presumable written by the user who has composed post 500. In particular embodiments, social-networking system 160 may incorporate additional content items to post 500. For example, a "like" icon 504 and a comment icon 505 are added to post 500, allowing other users to provide feedback concerning post 500.

Figure 6:
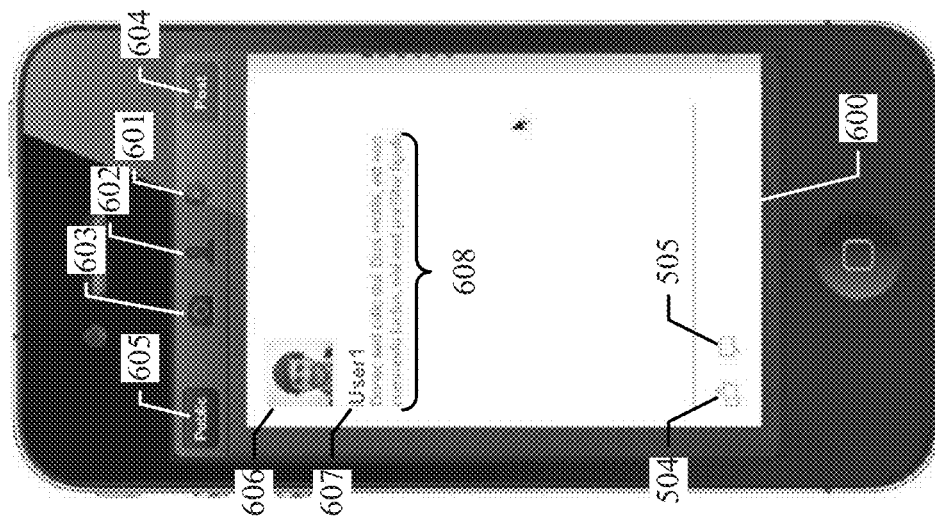
FIG. 6 illustrates an example post under composition.

In particular embodiments, a content composer helps a user compose a content item, such as post 500. FIG. 6 illustrates an example content item 600 (e.g., another post) under composition by a user (e.g., User X for clarification purposes). When a user begins to compose a content item, the content composer may create a new content item (e.g., post 600) with some default content already included in it. This makes the composition process easier for the user. In this example, when User X begins to compose a new post, the content composer may create new post 600 and present it to User X for further edition. The content composer includes some default content in post 600, such as a thumbnail image 606 and the name 607 of User X, a "like" icon 504, and a comment icon 505. In addition, post 600 includes a text message 608 written by User X.

In particular embodiments, there may be a set of templates predefined for different types of content items or different types of devices. Each template may have a default layout suitable for a specific type of content items or a specific type of devices having screens of a specific size, aspect ratio, or orientation. When a user requests to compose a new content item, the content composer may choose from the set of templates a specific template suitable for that type of content items. In this example, content item 600 is a post displayed on a Smartphone. The content composer thus selects a template suitable for posts, which includes thumbnail image 606 and name 607 of the user who is composing post 600. The screen of the Smartphone has a portrait orientation. The content composer thus selects a template that also has a portrait orientation, matching the screen of the Smartphone.

In particular embodiments, the content composer may use information available in social-networking system 160 (e.g., information stored in social graph 300 or information from user accounts at social-networking system 160) to help a user compose a content item. In this example, thumbnail image 606 and name 607 of User X may be obtained from User X's profile information stored in social-networking system 160. Thumbnail image 606 of User X may be User X's profile image at social-networking system 160.

In particular embodiments, the content composer also provides various icons, corresponding to various composing functions, that help a user further edit a content item under composition. In this example, there is an icon 601 that represents the "location" content type, an icon 602 that represents the "user" content type, and an icon 603 that represents the "image" content type (e.g., including digital photos). Icons 601, 602, and 603 respectively represent three different content types (i.e., location, user, and image). Each icon 601, 602, or 603 may be used to add content items of the corresponding content type to post 600. In addition, there is a "Post" button 604. While User X is editing post 600, User X may select "Post" button 604 at any time to preview what post 600 would look like after it is published (e.g., to User X's wall at social-networking system 160). There is a "Public" button 605. When User X finishes editing and composing post 600, User X may select "Public" button 605, which causes post 600 to be published (e.g., to User X's wall at social-networking system 160). This makes post 600 publicly available so that it can be viewed by all other users. The content composer may implement additional or alternative functions, and this disclosure contemplates any applicable functions supported by a content composer.

Figure 7C:
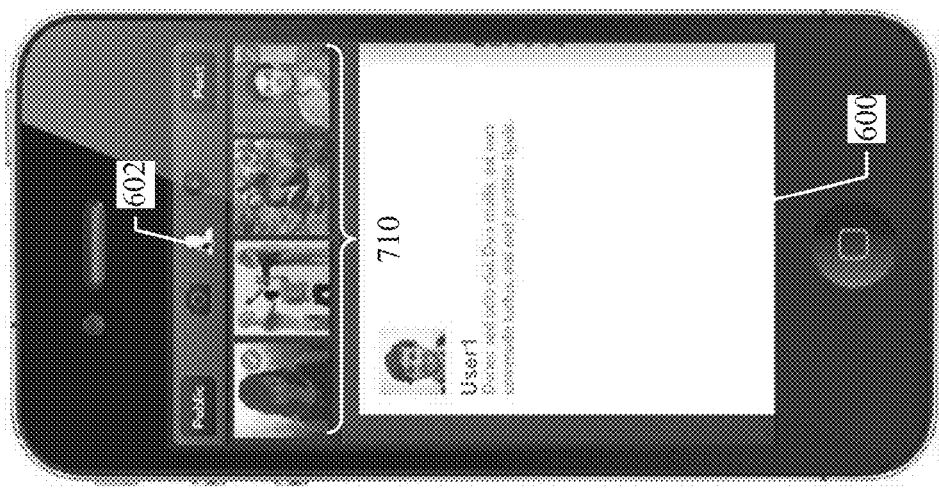
FIGS. 7A-7I illustrate an example of incorporating a user content item to a post under composition.
Figure 7B:
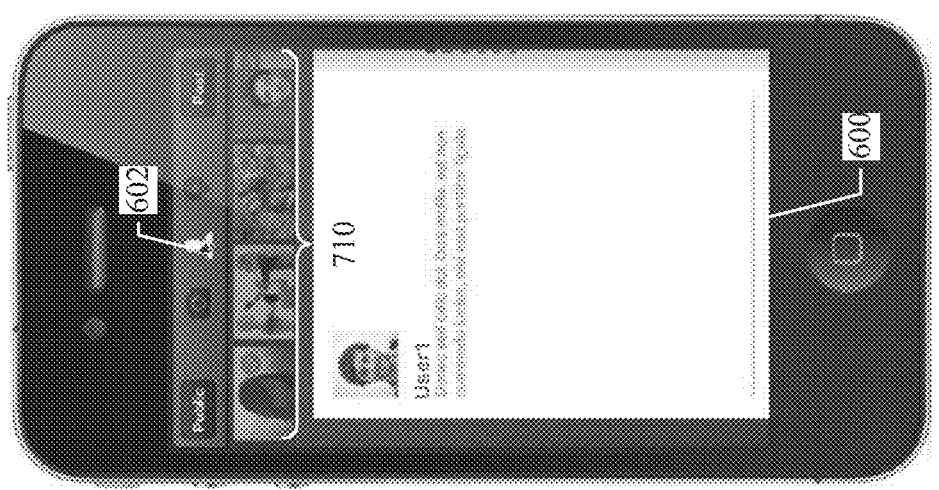
Figure 7A:
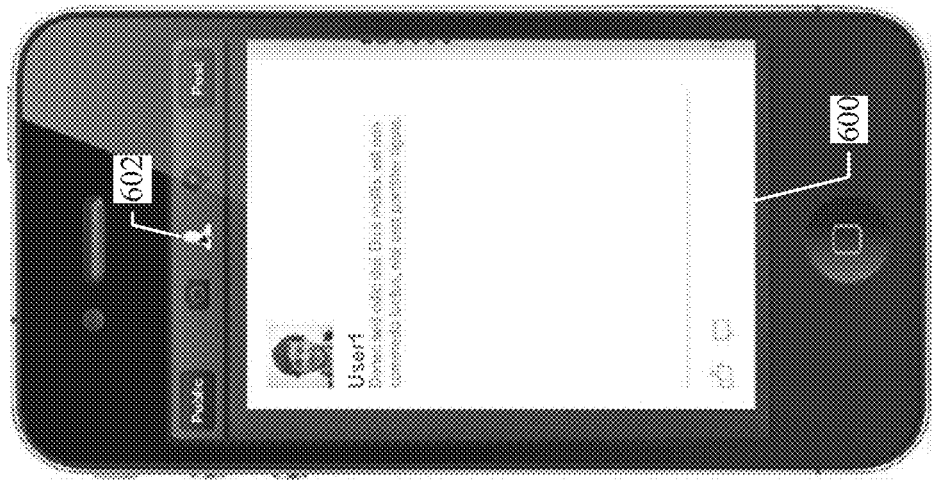

FIGS. 7A-7I illustrate an example of adding a "user" content item to post 600 using "user" icon 602. Suppose that User X is editing post 600 and wishes to add another user (e.g., User Y for clarification purposes) to post 600. User X selects "user" icon 602 (e.g., by tapping or clicking on "user" icon 602), which represents the "user" content type, as illustrated in FIG. 7A. Here, "user" icon 602 is highlighted to indicate that it has been selected by User X. This user selection of "user" icon 602 causes post 600 to move down somewhat on the screen, making some space available above post 600. At the same time, a series of icons 710 (e.g., small images) gradually appears on the screen above post 600, as illustrated in FIG. 7B. Each icon from icon series 710 represents a user, as illustrated in FIG. 7C. For example, each icon from icon series 710 may be the profile image of the user at social-networking system 160 whom the icon represents. User X may scroll back and forth through icon series 710 to locate a specific user (e.g., User Y) to add to post 600.

There are different criteria for selecting the users whose representative icons are included in icon series 710, and this disclosure contemplates any applicable criteria for selecting the users. As an example, the selected users may include friends of User X, friends of friends of User X, other users who have been tagged in the same photo as User X, other users who have checked in at the same location as User X, other users who have attended the same event as User X, or any combination of the above. The selected users may be sorted according to their respective levels of affinity with User X (e.g., based on information stored in social graph 300), such that those users having higher levels of affinity with User X (e.g., a friend of User X whom User X has met in the past few days) are positioned near the beginning of icon series 710, while those users having lower levels of affinity with User X are positioned near the end of icon series 710. Of course, the affinity level between two users may change over time. Hence, the selected users may be sorted according to their current levels of affinity with User X at the time post 600 is being edited by User X.

Figure 7F:
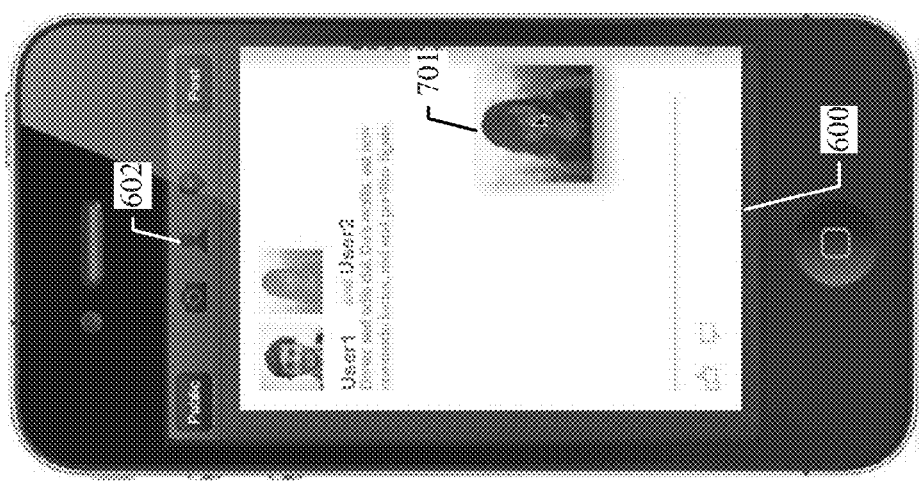
Figure 7E:
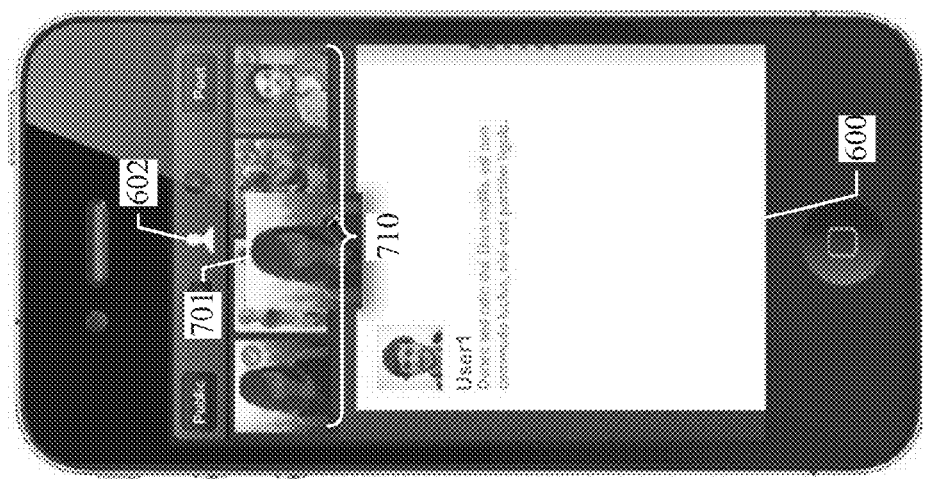
Figure 7D:
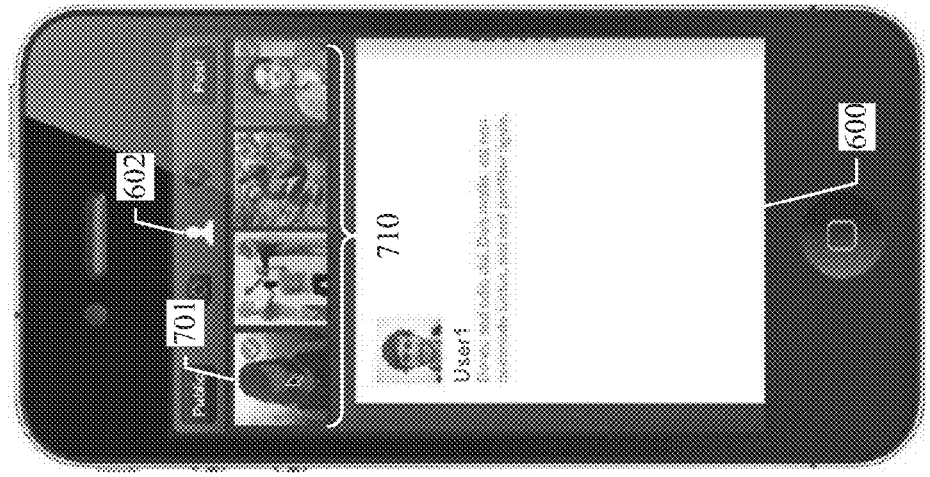

Suppose that User X selects an icon 701 from icon series 710, which represents User Y, as illustrated in FIG. 7D. Icon 701 may be the profile image of User Y. In FIG. 7E, User X drags icon 701, representing User Y, onto post 600. In FIG. 7F, User X drops icon 701 on post 600. At this point, post 600 has moved up and returned to its original position on the screen. Icon series 710 is no longer shown on the screen since it is no longer needed after User X has made a selection.

Figure 7I:
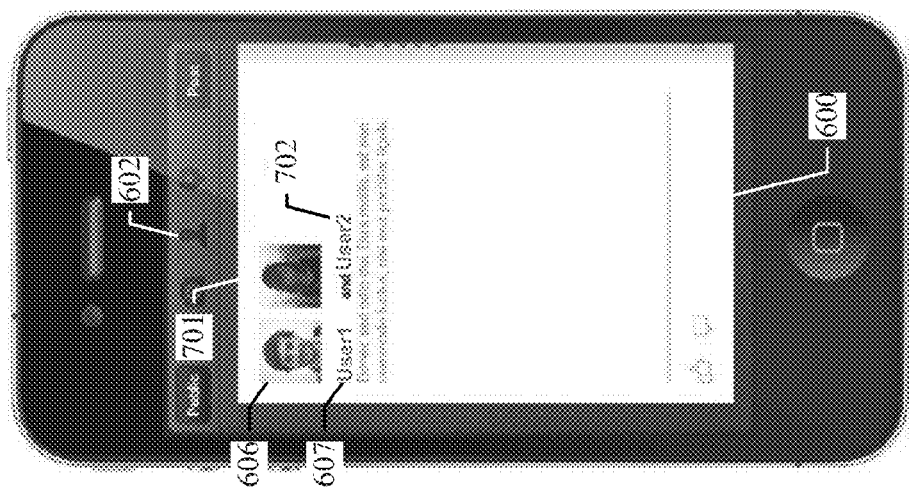
Figure 7H:
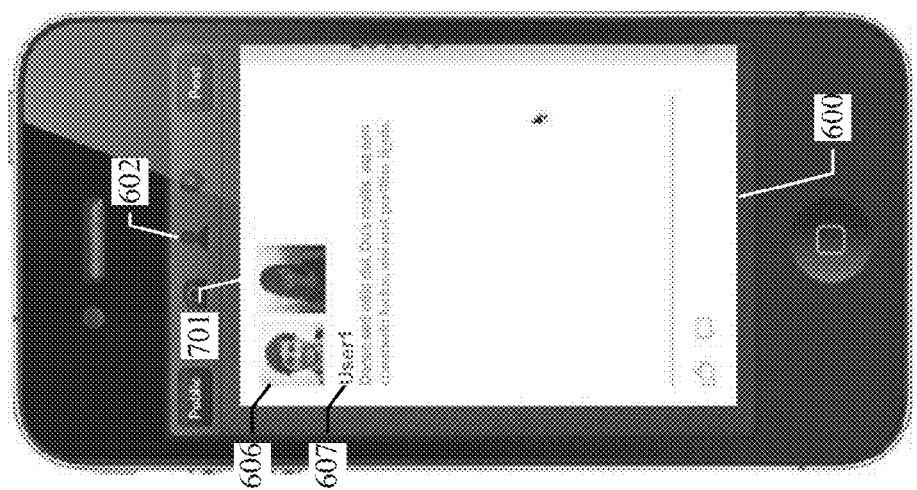
Figure 7G:
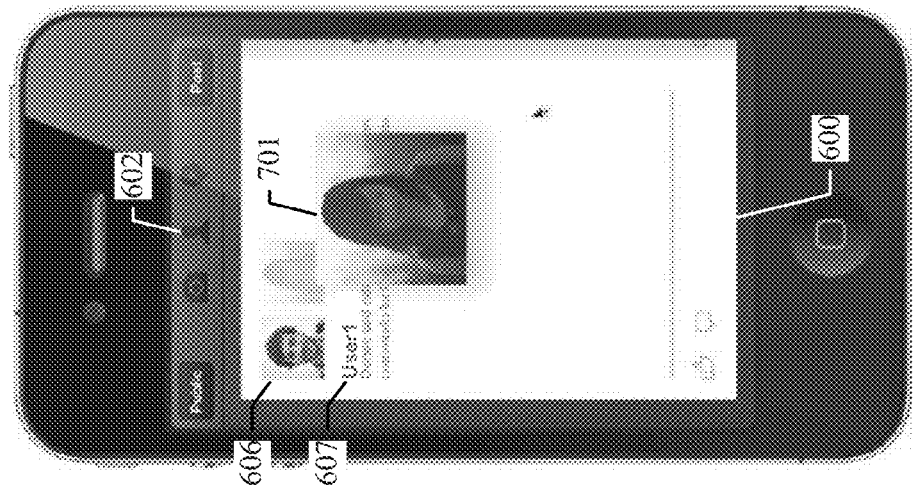

Once User X releases icon 701 onto post 600, icon 701 automatically resizes to its predefined size and moves to its predefined position on post 600, as illustrated in FIG. 7G. The predefined size or position for each type of content items may be specified in the template selected for composing a content item. In this example, the template selected for post 600 may specify that additional users should be positioned on post 600 next to the user composing the post (i.e., User X). In FIG. 7H, icon 701 representing User Y is automatically resized and positioned next to icon 606 representing User X (e.g., according to the template selected for post 600). In FIG. 7I, the name 702 of User Y is retrieved from User Y's profile with social-networking system 160 and displayed in post 600, next to name 607 of user X. The word "and" is automatically added between name 607 of User X and name 702 of User Y.

User X may repeat the process illustrated in FIGS. 7A-7I to similarly add additional users to post 600.

Figure 8A:
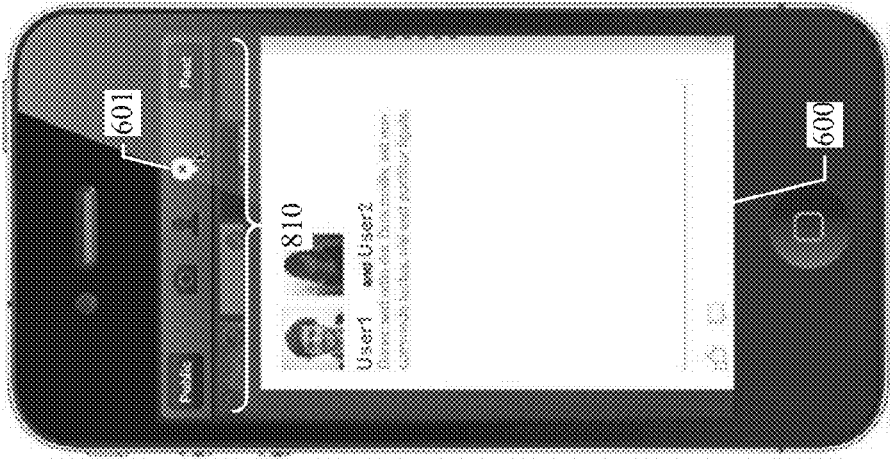
FIGS. 8A-8F illustrate an example of incorporating a location content item to a post under composition.
Figure 8B:

FIGS. 8A-8F illustrate an example of adding a "location" content item to post 600 using "location" icon 601. Suppose that User X is editing post 600 and wishes to add a location to post 600. User X selects "location" icon 601 (e.g., by tapping or clicking on "location" icon 601), which represents the "location" content type, as illustrated in FIG. 8A. Here, "location" icon 601 is highlighted to indicate that it has been selected by User X. This user selection of "location" icon 601 causes post 600 to move down somewhat on the screen, making some space available above post 600. At the same time, a series of icons 810 (e.g., small images) gradually appears on the screen above post 600. Each icon from icon series 810 represents a location, as illustrated in FIG. 8B. User X may scroll back and forth through icon series 810 to locate a specific location to add to post 600.

There are different criteria for selecting the locations whose representative icons are included in icon series 810, and this disclosure contemplates any applicable criteria for selecting the locations. As an example, the selected locations may include locations User X has visited, locations from where User X has checked in, locations where events attended by User X were held, locations friends of User X have visited or checked in, locations friends of friends of User X have visited or checked in, or any combination of the above. The selected locations may be sorted according to their respective levels of affinity with User X (e.g., based on information stored in social graph 300), such that those locations having higher levels of affinity with User X (e.g., locations User X has visited within the past few days) are positioned near the beginning of icon series 810, while those locations having lower levels of affinity with User X (e.g., locations User X has never been to personally) are positioned near the end of icon series 810. Again, the affinity level between a user and a location may change over time. Hence, the selected locations may be sorted according to their current levels of affinity with User X at the time post 600 is being edited by User X.

Figure 8C:
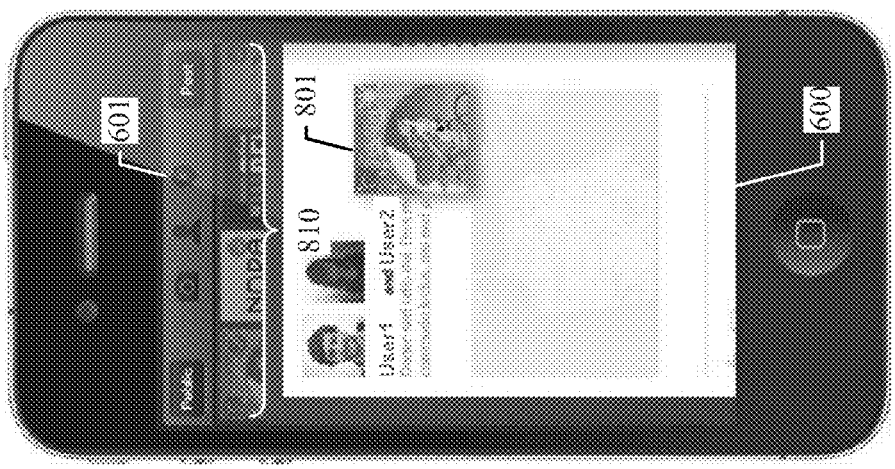
Figure 8F:
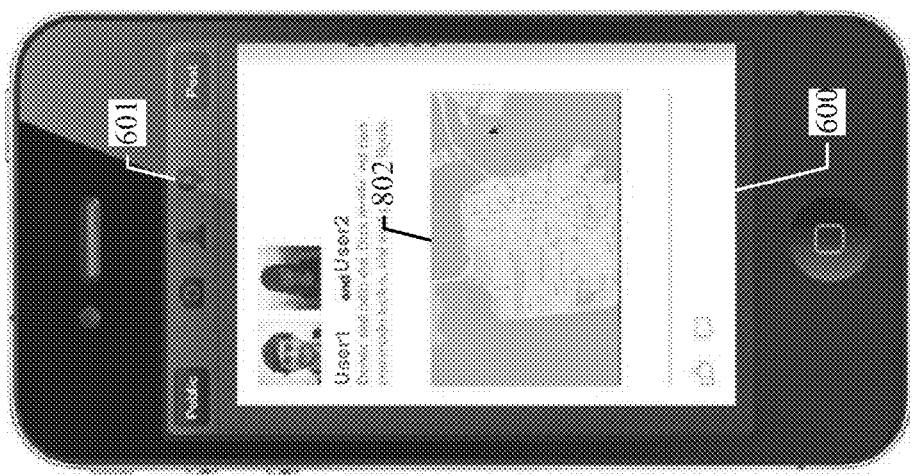

Suppose that User X selects an icon 801 from icon series 810, which represents a specific location (e.g., Location Y for clarification purposes), as illustrated in FIG. 8B. In FIG. 8C, User X drags icon 801, representing Location Y, onto post 600. At the same time, post 600 gradually moves up on the screen while icon series 810 gradually disappears from the screen as it is no longer needed after User X has made a selection. In FIG. 8D, User X drops icon 801 on post 600. At this point, post 600 has returned to its original position on the screen, and icon series 810 is no longer visible on the screen.

Figure 8E:
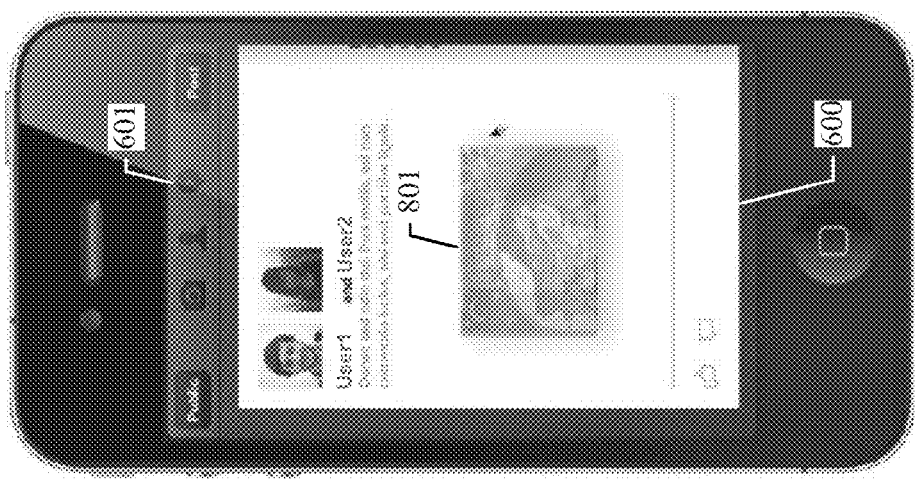
Figure 8D:
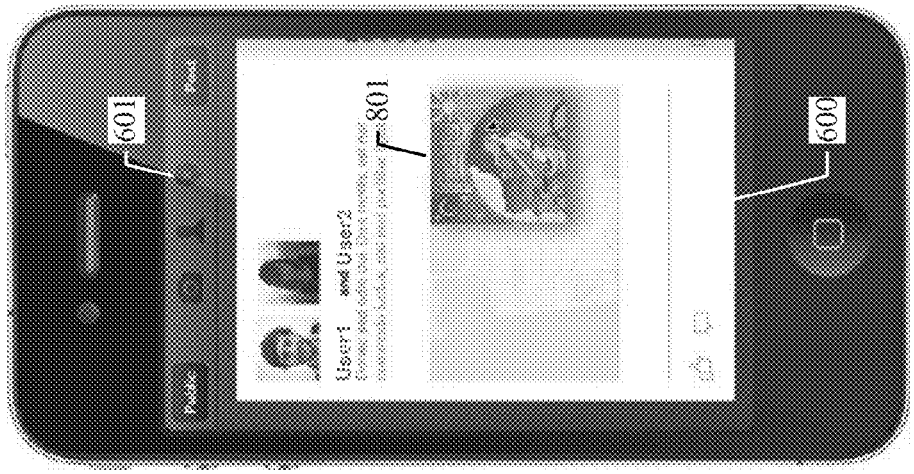

Once User X releases icon 801 onto post 600, icon 801 automatically moves towards its predefined position on post 600, as illustrated in FIG. 8E. Again, the predefined size or position for each type of content items may be specified in the template selected for composing a content item. In this example, the template selected for post 600 may specify that a location content item should be positioned in the next available space on post 600. At the same time, a map 802 gradually replaces icon 801. Map 802 gradually fades in while icon 801 gradually fades out. In FIG. 8F, map 802 is now included in post 600 (replacing icon 801), and map 802 shows Location Y, represented by icon 801.

User X may repeat the process illustrated in FIGS. 8A-8F to similarly add additional locations to post 600.

Figure 9C:
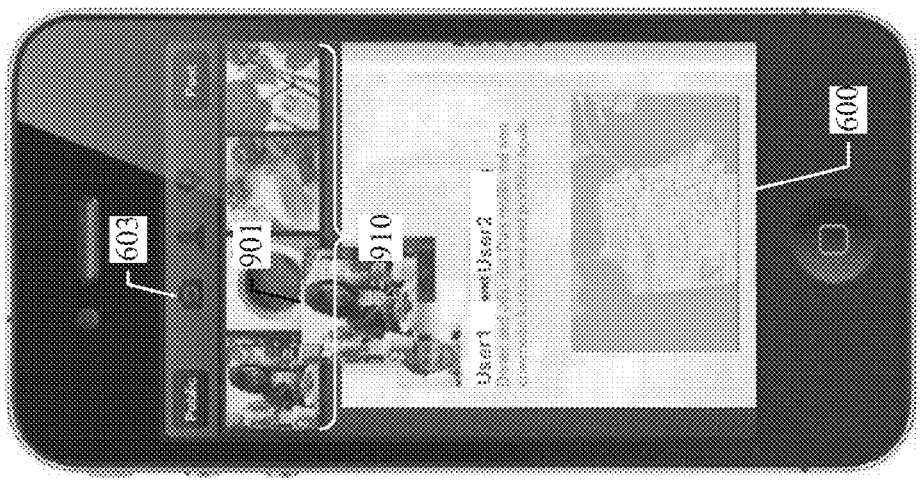
FIGS. 9A-9F illustrate an example of incorporating an image content item to a post under composition.
Figure 9B:
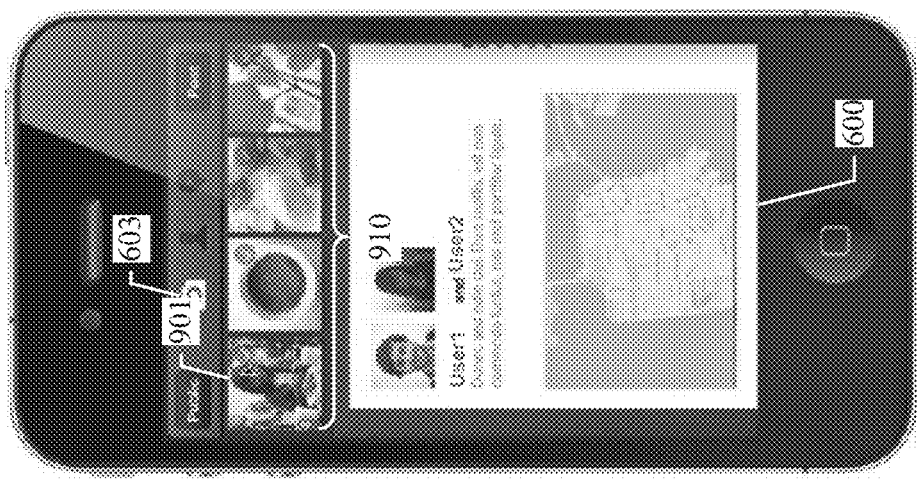
Figure 9A:
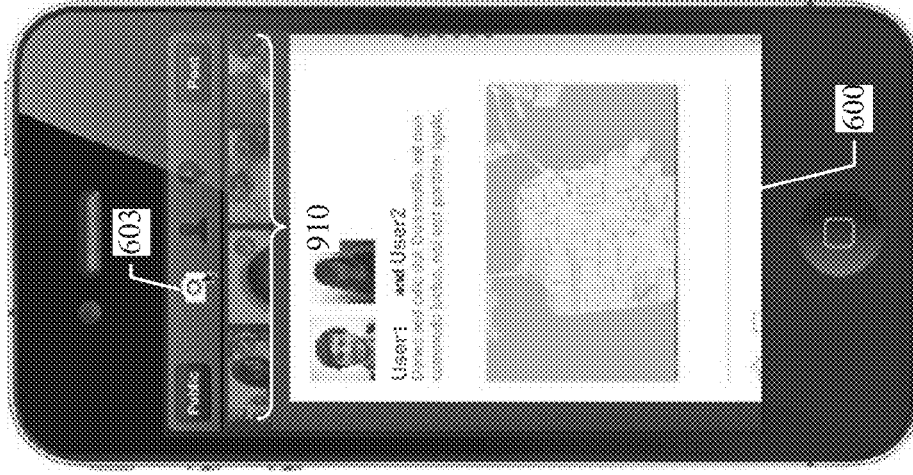

FIGS. 9A-9F illustrate an example of adding an "image" content item to post 600 using "image" icon 603. Suppose that User X is editing post 600 and wishes to add an image to post 600. User X selects "image" icon 603 (e.g., by tapping or clicking on "image" icon 603), which represents the "image" content type, as illustrated in FIG. 9A. Here, "image" icon 603 is highlighted to indicate that it has been selected by User X. This user selection of "image" icon 603 causes post 600 to move down somewhat on the screen, making some space available above post 600. At the same time, a series of icons 910 (e.g., small images) gradually appears on the screen above post 600. Each icon from icon series 910 represents an image, as illustrated in FIG. 9B. For example, each icon may be the thumbnail of the image it represents. User X may scroll back and forth through icon series 910 to locate a specific image to add to post 600.

There are different criteria for selecting the images whose representative icons are included in icon series 910, and this disclosure contemplates any applicable criteria for selecting the images. As an example, the selected images may include images User X has uploaded to social-networking system 160, images of User X, images of friends of User X, images of friends of friends of User X images tagged with or by User X, images taken at an event attended by User X, images User X likes or has commented on, or any combination of the above. The selected images may be sorted according to their respective levels of affinity with User X (e.g., based on information stored in social graph 300), such that those images having higher levels of affinity with User X (e.g., images of User X) are positioned near the beginning of icon series 910, while those images having lower levels of affinity with User X are positioned near the end of icon series 910. Again, the affinity level between a user and an image may change over time. Hence, the selected images may be sorted according to their current levels of affinity with User X at the time post 600 is being edited by User X.

Suppose that User X selects an icon 901 from icon series 910, which represents a specific image (e.g., Image Y for clarification purposes), as illustrated in FIG. 9B. In FIG. 9C, User X drags and drops icon 901, representing Image Y, onto post 600.

Figure 9F:
Figure 9E:
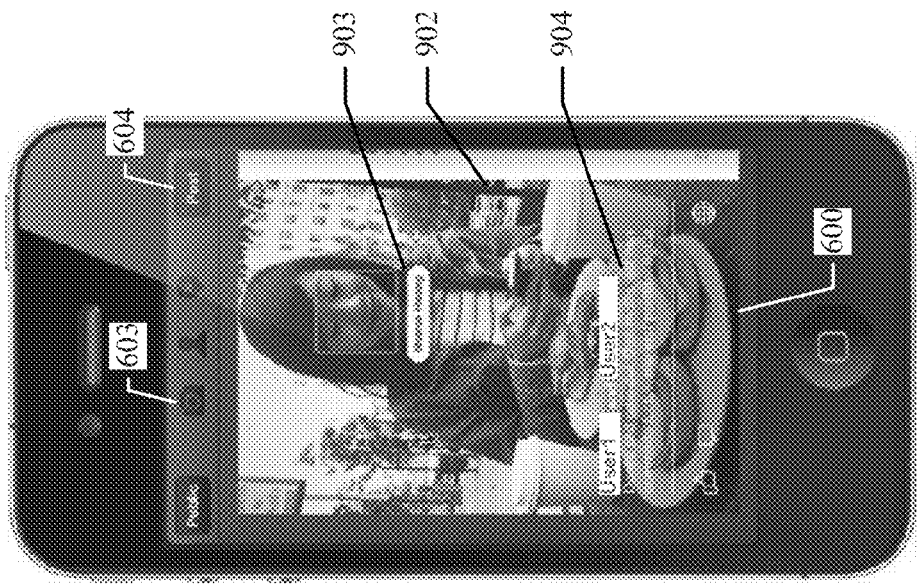
Figure 9D:
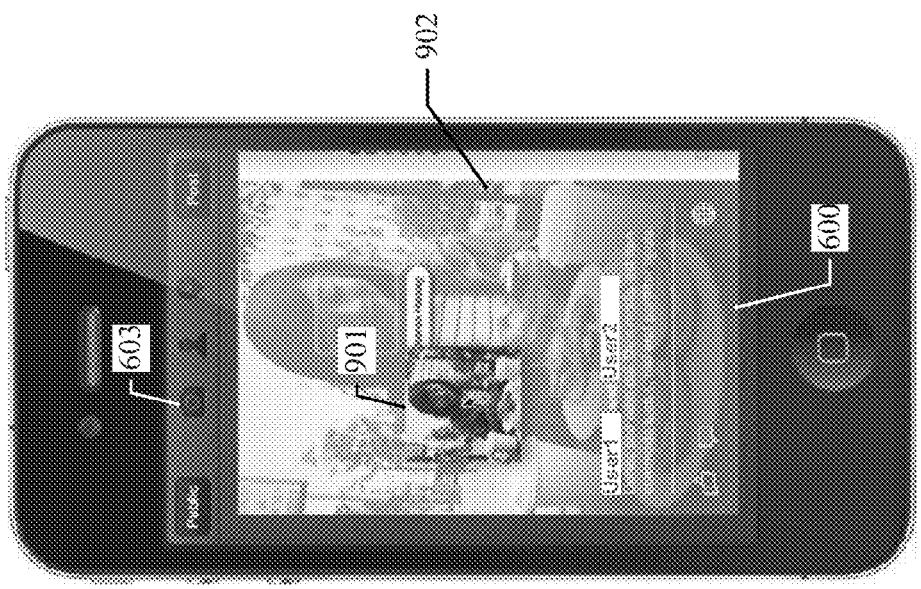

Once User X releases icon 901 onto post 600, icon 901 automatically moves towards its predefined position on post 600, as illustrated in FIG. 9D. Again, the predefined size or position for each type of content items may be specified in the template selected for composing a content item. In this example, the template selected for post 600 may specify that an image content item should be positioned in the next available space on post 600 (e.g., in this case, after map 802). In addition, an image should be shown in the full-screen mode in post 600. Thus, icon 901 (i.e., a thumbnail) is gradually replaced by the full-size image 902 it represents. At this point, post 600 has returned to its original position on the screen, and icon series 910 is no longer visible on the screen.

Initially, full-size image 902 appears transparently, while icon 901 overlays on top of it, as illustrated in FIG. 9D. As icon 901 gradually fades out and disappears from the screen, image 902 gradually fades in and becomes more solid, as illustrated in FIG. 9E. In addition, if there is metadata associated with image 902, it may be shown (e.g., overlays on top of image 902). For example, image 902 is tagged with a user 903. The name of user 903 is shown, overlaying on image 902. In addition, image 902 has a caption or description 904, which is also shown, overlaying on image 902.

At any time while User X is editing post 600, User X may select "Post" button 604 to preview what post 600 would look like when it is published. For example, suppose that User X has selected "Post" button 604 at this point (i.e., from FIG. 9E). In FIG. 9F, a preview of post 600 illustrating what post 600 would appear when published is shown. User X may scroll through various pages of post 600 already constructed, as if post 600 has already been published, to test its appearance and functionalities.

User X may repeat the process illustrated in FIGS. 9A-9F to similarly add additional images to post 600. FIGS. 10A-10E illustrate an example of adding a second "image" content item to post 600 using "image" icon 603. In FIG. 10A, User X again selects "image" icon 603, which causes icon series 910 to appear again, above post 600. Note that each icon in icon series 910 has a checkmark. For icon 901, its checkmark has turned green because image 902 represented by icon 901 has already been included in post 600. The checkmarks of the other icons from icon series 910 are grey because the images represented by these other icons have not been included in post 600. In particular embodiments, there is a visual indication associated with each icon representing a specific content item (e.g., user, location, image, etc.), indicating whether the content item represented by the icon has already been included in post 600 (e.g., using different colors of checkmarks).

Figure 10A:
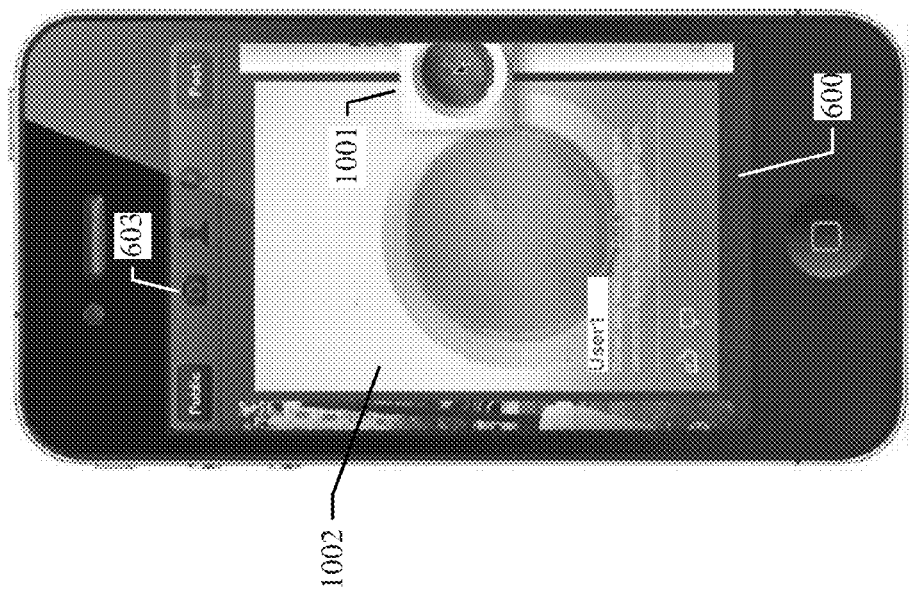
FIGS. 10A-10E illustrate an example of incorporating an image content item to a post under composition.
Figure 10B:
Figure 10C:
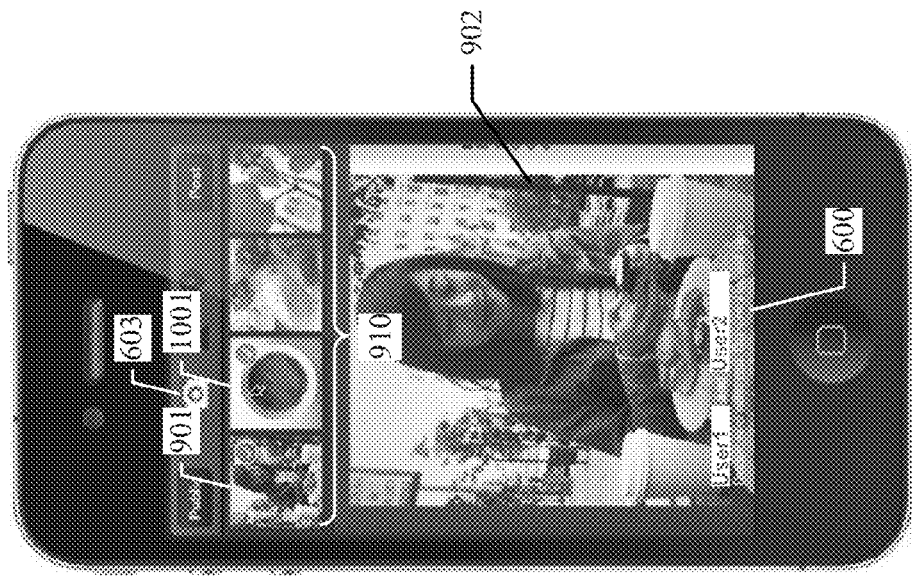
Figure 10E:
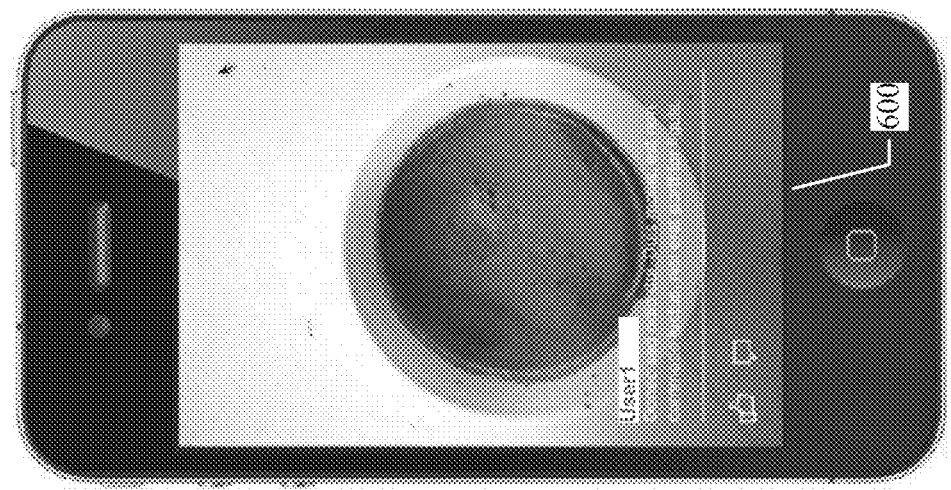
Figure 10D:
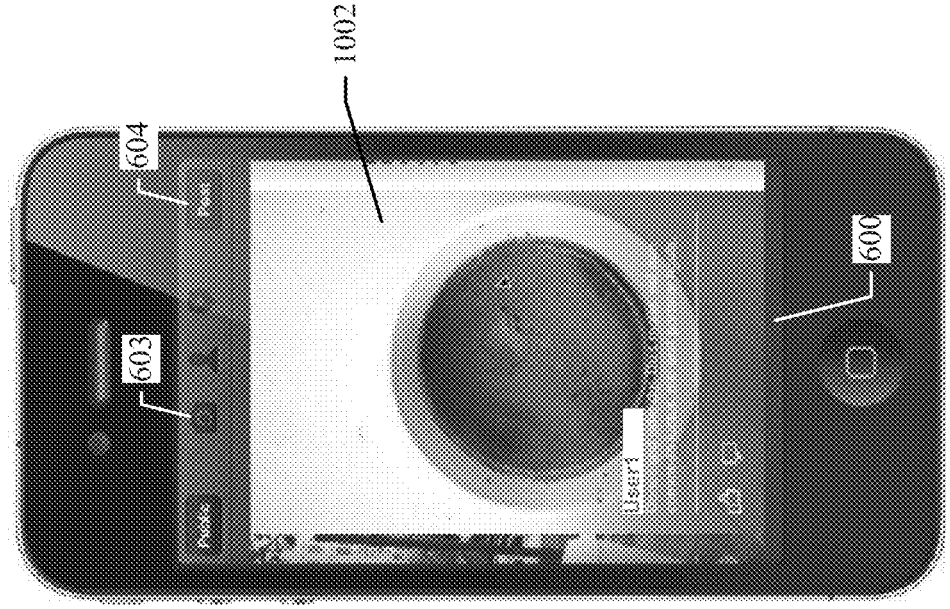

In FIG. 10B, User X selects another icon 1001 representing another image (e.g., Image Z for clarification purposes), and drags and drops icon 1001 onto post 600. In FIG. 10C, after User X drops icon 1001 onto post 600, image 1002 represented by icon 1001 gradually appears. Here, image 1002 is automatically positioned after image 902 and in the full-screen mode. In FIG. 10D, image 1002 is shown in the full-screen mode, replacing icon 1001. Suppose that User X selects "Post" button 604 at this point. This causes a preview of post 600 to be shown again, now including image 1002, as illustrated in FIG. E.

Figure 11C:
FIGS. 11A-11C illustrate an example of adding a user tag to an image.
Figure 11B:
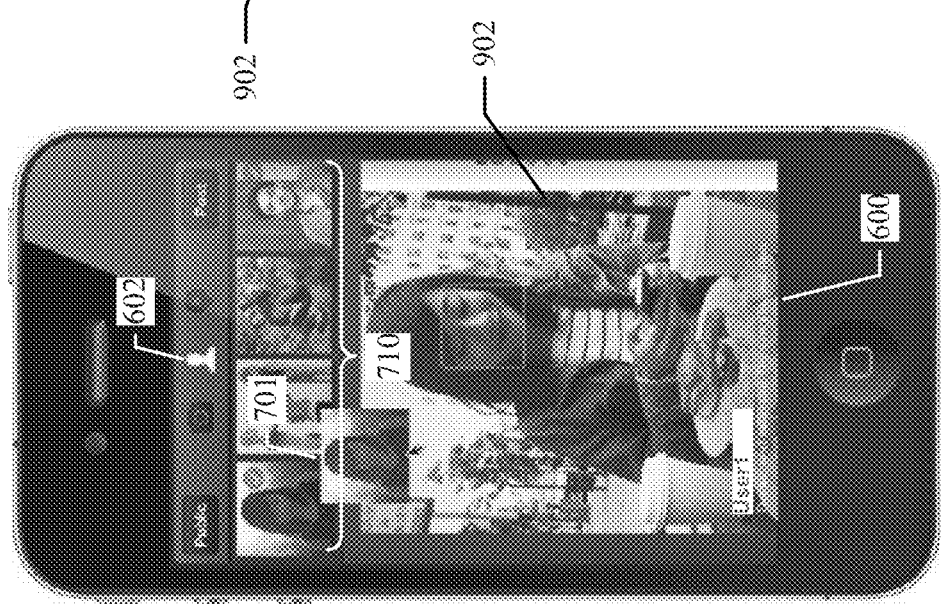
Figure 11A:
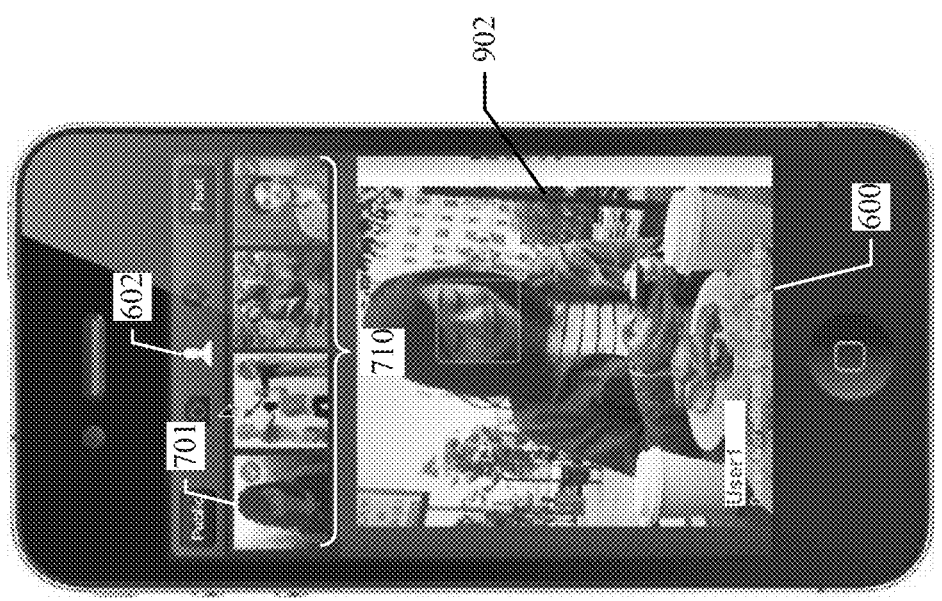

In particular embodiments, additional information may be associated with an image included in post 600. FIGS. 11A-11C illustrate an example of tagging a user in an image content item using "user" icon 602. Suppose that after adding image 902 to post 600, User X wishes to tag the user (i.e., User Y) shown in image 902. User X may select "user" icon 602 to cause icon series 710 to appear again, as illustrated in FIG. 11A, which is similar to FIG. 7B. User X may select icon 701, representing User Y (i.e., the user shown in image 902), from icon series 710 and drags and drops icon 701 onto image 902, as illustrated in FIG. 11B. The name 702 of User Y, represented by icon 701, may be retrieved from User Y's profile with social-networking system 160 and used to tag the user in image 902, as illustrated in FIG. 11C. After post 600 is published, if someone clicks on the user in image 902, name 702 may appear in response, as image 902 is now tagged with name 702 of User Y.

Figure 12C:
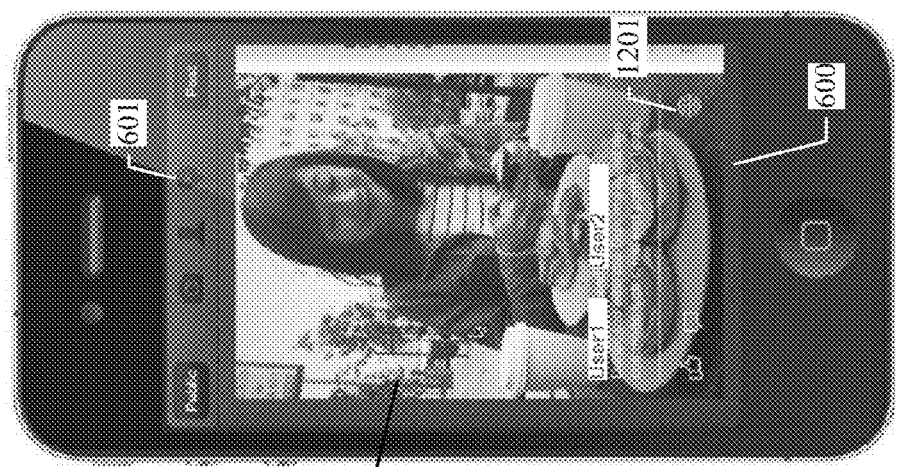
FIGS. 12A-12C illustrate an example of adding a location tag to an image.
Figure 12B:
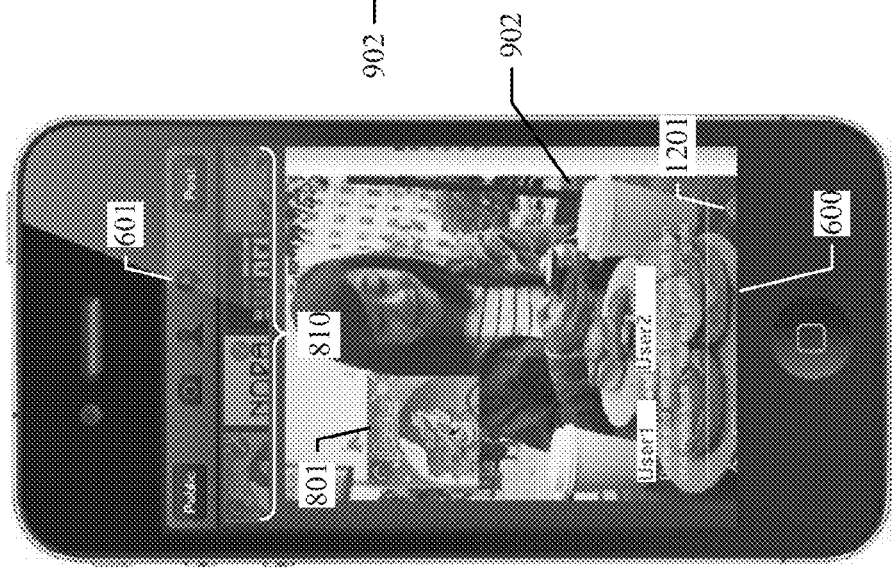
Figure 12A:
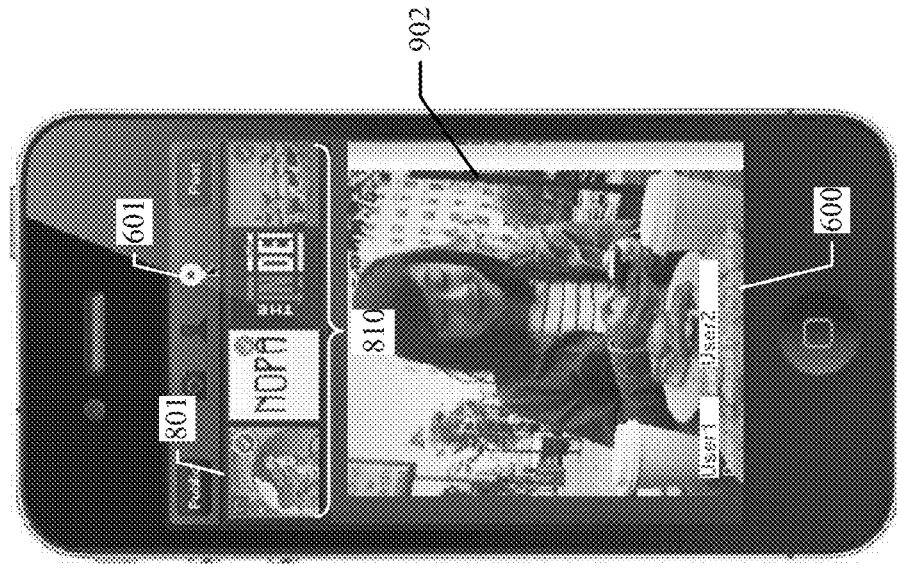

FIGS. 12A-12C illustrate an example of associating a location with an image content item using "location" icon 601. Suppose that after adding image 902 to post 600, User X wishes to associate a geo-tag with image 902, showing where (i.e., the geographical location) image 902 was taken. User X may select "location" icon 601 to cause icon series 810 to appear again, as illustrated in FIG. 12A, which is similar to FIG. 8B. User X may select icon 801, representing Location Y (i.e., the location where image 902 was taken), from icon series 810 and drags and drops icon 801 onto image 902, as illustrated in FIG. 12B. In FIG. 12C, a geo-tag 1201 is added to and associated with image 902. Geo-tag 1201 corresponds to Location Y where image 902 was taken. After post 600 is published, if someone clicks on geo-tag 1201, a map (e.g. map 802) showing Location Y may appear in response.

Figure 13C:
FIGS. 13A-13F illustrate examples of removing content items from a post under composition.
Figure 13B:
Figure 13A:
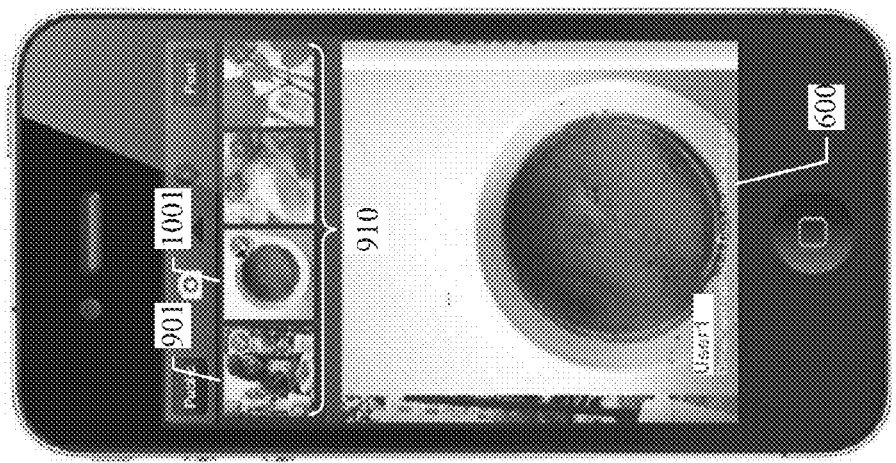

While User X is editing post 600, User X may remove a content item from post 600 at any time. FIGS. 13A-13F illustrate examples of removing content items from post 600. In FIG. 13A, Images Y and Z, respectively represented by icons 901 and 1001, are currently included in post 600. Thus, the checkmarks associated with icons 901 and 1001 are green, while the checkmarks associated with other icons from icon series 910 are grey. To remove, for example, Image Z from post 600, User X may unselect Image Z by uncheck the checkmark associated with icon 1001 representing Image Z, as illustrated in FIG. 13B. This causes Image Z to be removed from post 600 and the checkmark associated with icon 1001 to become grey again, as illustrated in FIG. 13C.

Figure 13F:
Figure 13E:
Figure 13D:
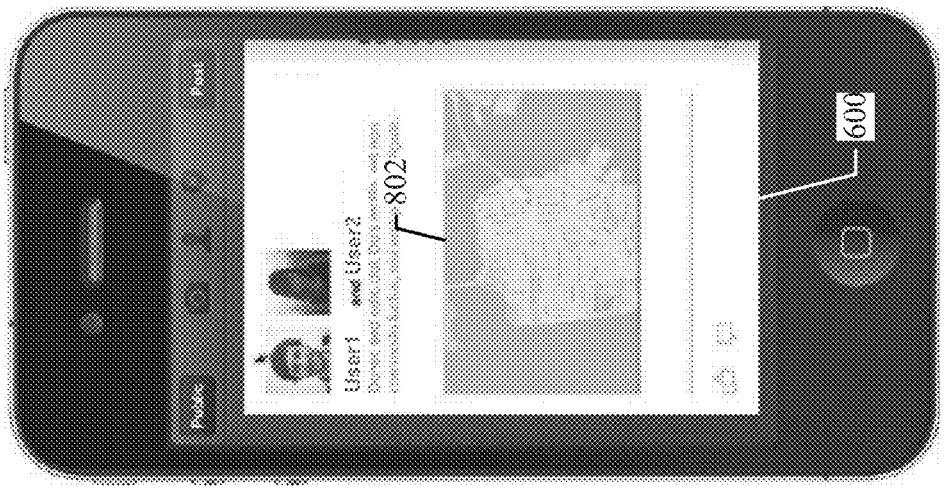

In FIG. 13D, post 600 currently includes map 802 showing Location Y. To remove map 802, and thus Location Y, from post 600, User X may select "location" icon 601 to cause icon series 810 to appear, as illustrated in FIG. 13E. At this point, the checkmark associated with icon 801, representing Location Y, is green. User X may uncheck the checkmark associated with icon 801. This causes map 802, and thus Location Y, to be removed from post 600, as illustrated in FIG. 13F. The checkmark associated with icon 801 becomes grey again.

Figure 14:
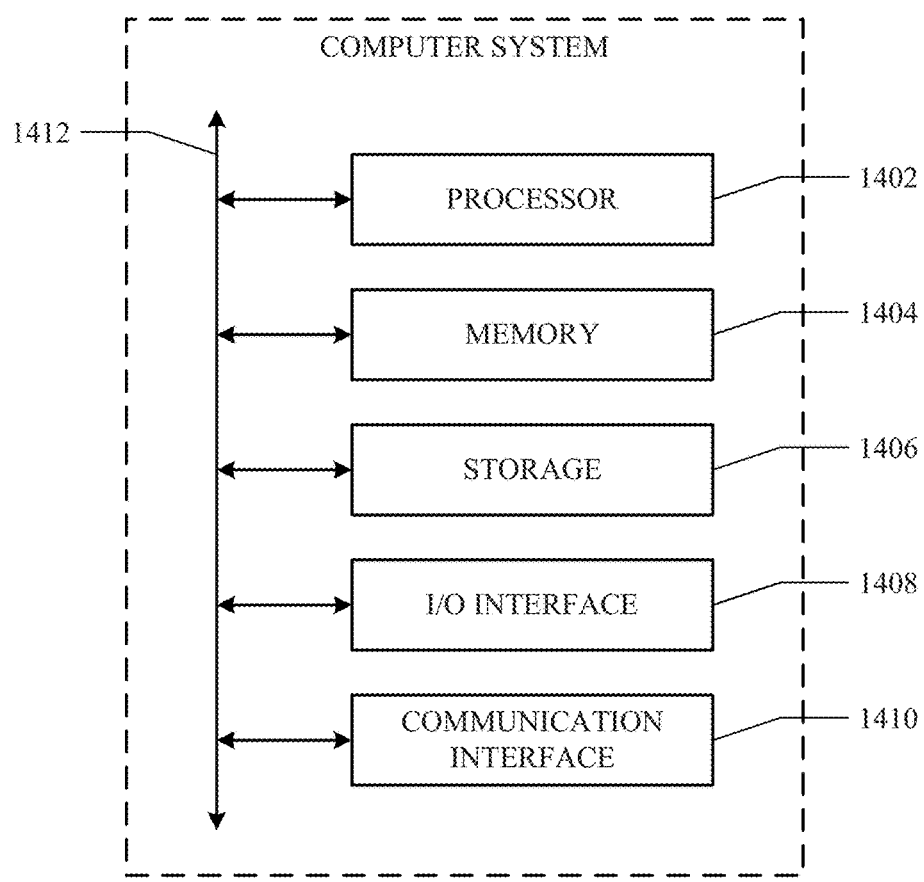
FIG. 14 illustrates an example computer system.

The functions described above may be implemented as computer software and executed on a computing device or system. FIG. 14 illustrates an example computer system 1400. In particular embodiments, one or more computer systems 1400 perform one or more steps of one or more methods described or illustrated herein. In particular embodiments, one or more computer systems 1400 provide functionality described or illustrated herein. In particular embodiments, software running on one or more computer systems 1400 performs one or more steps of one or more methods described or illustrated herein or provides functionality described or illustrated herein. Particular embodiments include one or more portions of one or more computer systems 1400. Herein, reference to a computer system may encompass a computing device, and vice versa, where appropriate. Moreover, reference to a computer system may encompass one or more computer systems, where appropriate.

This disclosure contemplates any suitable number of computer systems 1400. This disclosure contemplates computer system 1400 taking any suitable physical form. As example and not by way of limitation, computer system 1400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 1400 may include one or more computer systems 1400; be unitary or distributed; span multiple locations; span multiple machines; span multiple data centers; or reside in a cloud, which may include one or more cloud components in one or more networks. Where appropriate, one or more computer systems 1400 may perform without substantial spatial or temporal limitation one or more steps of one or more methods described or illustrated herein. As an example and not by way of limitation, one or more computer systems 1400 may perform in real time or in batch mode one or more steps of one or more methods described or illustrated herein. One or more computer systems 1400 may perform at different times or at different locations one or more steps of one or more methods described or illustrated herein, where appropriate.

In particular embodiments, computer system 1400 includes a processor 1402, memory 1404, storage 1406, an input/output (I/O) interface 1408, a communication interface 1410, and a bus 1412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1402 includes hardware for executing instructions, such as those making up a computer program. As an example and not by way of limitation, to execute instructions, processor 1402 may retrieve (or fetch) the instructions from an internal register, an internal cache, memory 1404, or storage 1406; decode and execute them; and then write one or more results to an internal register, an internal cache, memory 1404, or storage 1406. In particular embodiments, processor 1402 may include one or more internal caches for data, instructions, or addresses. This disclosure contemplates processor 1402 including any suitable number of any suitable internal caches, where appropriate. As an example and not by way of limitation, processor 1402 may include one or more instruction caches, one or more data caches, and one or more translation lookaside buffers (TLBs). Instructions in the instruction caches may be copies of instructions in memory 1404 or storage 1406, and the instruction caches may speed up retrieval of those instructions by processor 1402. Data in the data caches may be copies of data in memory 1404 or storage 1406 for instructions executing at processor 1402 to operate on; the results of previous instructions executed at processor 1402 for access by subsequent instructions executing at processor 1402 or for writing to memory 1404 or storage 1406; or other suitable data. The data caches may speed up read or write operations by processor 1402. The TLBs may speed up virtual-address translation for processor 1402. In particular embodiments, processor 1402 may include one or more internal registers for data, instructions, or addresses. This disclosure contemplates processor 1402 including any suitable number of any suitable internal registers, where appropriate. Where appropriate, processor 1402 may include one or more arithmetic logic units (ALUs); be a multi-core processor; or include one or more processors 1402. Although this disclosure describes and illustrates a particular processor, this disclosure contemplates any suitable processor.

In particular embodiments, memory 1404 includes main memory for storing instructions for processor 1402 to execute or data for processor 1402 to operate on. As an example and not by way of limitation, computer system 1400 may load instructions from storage 1406 or another source (such as, for example, another computer system 1400) to memory 1404. Processor 1402 may then load the instructions from memory 1404 to an internal register or internal cache. To execute the instructions, processor 1402 may retrieve the instructions from the internal register or internal cache and decode them. During or after execution of the instructions, processor 1402 may write one or more results (which may be intermediate or final results) to the internal register or internal cache. Processor 1402 may then write one or more of those results to memory 1404. In particular embodiments, processor 1402 executes only instructions in one or more internal registers or internal caches or in memory 1404 (as opposed to storage 1406 or elsewhere) and operates only on data in one or more internal registers or internal caches or in memory 1404 (as opposed to storage 1406 or elsewhere). One or more memory buses (which may each include an address bus and a data bus) may couple processor 1402 to memory 1404. Bus 1412 may include one or more memory buses, as described below. In particular embodiments, one or more memory management units (MMUs) reside between processor 1402 and memory 1404 and facilitate accesses to memory 1404 requested by processor 1402. In particular embodiments, memory 1404 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1404 may include one or more memories 1404, where appropriate. Although this disclosure describes and illustrates particular memory, this disclosure contemplates any suitable memory.

In particular embodiments, storage 1406 includes mass storage for data or instructions. As an example and not by way of limitation, storage 1406 may include a hard disk drive (HDD), a floppy disk drive, flash memory, an optical disc, a magneto-optical disc, magnetic tape, or a Universal Serial Bus (USB) drive or a combination of two or more of these. Storage 1406 may include removable or non-removable (or fixed) media, where appropriate. Storage 1406 may be internal or external to computer system 1400, where appropriate. In particular embodiments, storage 1406 is non-volatile, solid-state memory. In particular embodiments, storage 1406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1406 taking any suitable physical form. Storage 1406 may include one or more storage control units facilitating communication between processor 1402 and storage 1406, where appropriate. Where appropriate, storage 1406 may include one or more storages 1406. Although this disclosure describes and illustrates particular storage, this disclosure contemplates any suitable storage.

In particular embodiments, I/O interface 1408 includes hardware, software, or both, providing one or more interfaces for communication between computer system 1400 and one or more I/O devices. Computer system 1400 may include one or more of these I/O devices, where appropriate. One or more of these I/O devices may enable communication between a person and computer system 1400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1408 for them. Where appropriate, I/O interface 1408 may include one or more device or software drivers enabling processor 1402 to drive one or more of these I/O devices. I/O interface 1408 may include one or more I/O interfaces 1408, where appropriate. Although this disclosure describes and illustrates a particular I/O interface, this disclosure contemplates any suitable I/O interface.

In particular embodiments, communication interface 1410 includes hardware, software, or both providing one or more interfaces for communication (such as, for example, packet-based communication) between computer system 1400 and one or more other computer systems 1400 or one or more networks. As an example and not by way of limitation, communication interface 1410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1410 for it. As an example and not by way of limitation, computer system 1400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1400 may include any suitable communication interface 1410 for any of these networks, where appropriate. Communication interface 1410 may include one or more communication interfaces 1410, where appropriate. Although this disclosure describes and illustrates a particular communication interface, this disclosure contemplates any suitable communication interface.

In particular embodiments, bus 1412 includes hardware, software, or both coupling components of computer system 1400 to each other. As an example and not by way of limitation, bus 1412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1412 may include one or more buses 1412, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A computer-implemented method comprising:
creating and presenting a first content item on a user interface (UI) of an electronic device for editing by a first user;
presenting a plurality of icons respectively representing a plurality of content types;
in response to the first user selecting a specific icon representing a specific content type, presenting a plurality of second content items of the specific content type in an icon-series portion concurrently with the first content item and the plurality of icons on the UI, wherein the icon-series portion is presented by gradually sliding the icon-series portion into view until the plurality of second content items are displayed on the UI;
in response to the first user selecting a specific second content item,
visually displaying dragging of the second content item from a position in the icon-series portion and then dropping of the second content item to a predetermined position on the UI to represent the second content item being incorporated into the first content item, the predetermined position being associated with the first content item and separate from the position associated with the plurality of second content items, and
removing the icon-series portion comprising the plurality of second content items from display on the UI; and
adjusting the second content item to a final size at the predetermined position on the UI based on the specific content type of the specific second item.

2. The method of claim 1, further comprising automatically adjusting a layout of the first content item to accommodate for the specific second content item.

3. The method of claim 1, further comprising displaying a preview of the first content item to show how the first content item appears when published.

4. The method of claim 1, wherein:
the specific icon represents a user content type;
the plurality of second content items respectively represents a plurality of second users; and
incorporating the specific second content item into the first content item comprises incorporating a profile image and a name of a specific second user represented by the specific second content item into the first content item.

5. The method of claim 1, wherein:
the specific icon represents a location content type;
the plurality of second content items respectively represents a plurality of locations; and
incorporating the specific second content item into the first content item comprises incorporating a map showing a specific location represented by the specific second content item into the first content item.

6. The method of claim 1, wherein:
the specific icon represents an image content type;
the plurality of second content items respectively represents a plurality of image; and
incorporating the specific second content item into the first content item comprises incorporating a specific image represented by the specific second content item into the first content item.

7. The method of claim 6, further comprising:
in response to the first user selecting another specific icon representing a user content type, presenting a plurality of third content items respectively representing a plurality of second users; and
in response to the first user selecting a specific third content item, tagging the specific image with a name of a specific second user represented by the specific third content item.

8. The method of claim 6, further comprising:
in response to the first user selecting another specific icon representing a location content type, presenting a plurality of third content items respectively representing a plurality of locations; and
in response to the first user selecting a specific third content item, tagging the specific image with a specific location represented by the specific third content item.

9. One or more computer-readable non-transitory storage media embodying software that is operable when executed to:
create and presenting a first content item on a user interface (UI) of an electronic device for editing by a first user;
present a plurality of icons respectively representing a plurality of content types;
in response to the first user selecting a specific icon representing a specific content type, present a plurality of second content items of the specific content type in an icon-series portion concurrently with the first content item and the plurality of icons on the UI, wherein the icon-series portion is presented by gradually sliding the icon-series portion into view until the plurality of second content items are displayed on the UI;
in response to the first user selecting a specific second content item,
visually display dragging of the second content item from a position in the icon-series portion and then dropping of the second content item to a predetermined position on the UI to represent the second content item being incorporated into the first content item, the predetermined position being associated with the first content item and separate from the position associated with the plurality of second content items, and
remove the icon-series portion comprising the plurality of second content items from display on the UI; and
adjust the second content item to a final size at the predetermined position on the UI based on the specific content type of the specific second item.

10. The media of claim 9, wherein the software is further operable when executed to
automatically adjust a layout of the first content item to accommodate for the specific second content item.

11. The media of claim 9, wherein the software is further operable when executed to display a preview of the first content item to show how the first content item appears when published.

12. The media of claim 9, wherein:
the specific icon represents a user content type;
the plurality of second content items respectively represents a plurality of second users; and
incorporating the specific second content item into the first content item comprises incorporating a profile image and a name of a specific second user represented by the specific second content item into the first content item.

13. The media of claim 9, wherein:
the specific icon represents a location content type;
the plurality of second content items respectively represents a plurality of locations; and
incorporating the specific second content item into the first content item comprises incorporating a map showing a specific location represented by the specific second content item into the first content item.

14. The media of claim 9, wherein:
the specific icon represents an image content type;
the plurality of second content items respectively represents a plurality of image; and
incorporating the specific second content item into the first content item comprises incorporating a specific image represented by the specific second content item into the first content item.

15. A system comprising:
one or more processors; and
a memory coupled to the processors comprising instructions executable by the processors, the processors operable when executing the instructions to:
create and presenting a first content item on a user interface (UI) of an electronic device for editing by a first user;
present a plurality of icons respectively representing a plurality of content types;
in response to the first user selecting a specific icon representing a specific content type, present a plurality of second content items of the specific content type in an icon-series portion concurrently with the first content item and the plurality of icons on the UI, wherein the icon-series portion is presented by gradually sliding the icon-series portion into view until the plurality of second content items are displayed on the UI;
in response to the first user selecting a specific second content item,
visually display dragging of the second content item from a position in the icon-series portion and then dropping of the second content item to a predetermined position on the UI to represent the second content item being incorporated into the first content item, the predetermined position being associated with the first content item and separate from the position associated with the plurality of second content items, and
remove the icon-series portion comprising the plurality of second content items from display on the UI; and
adjust the second content item to a final size at the predetermined position on the UI based on the specific content type of the specific second item.

16. The system of claim 15, wherein the processors are further operable when executing the instructions to
automatically adjust a layout of the first content item to accommodate for the specific second content item.

17. The system of claim 15, wherein the processors are further operable when executing the instructions to
display a preview of the first content item to show how the first content item appears when published.

18. The system of claim 15, wherein:
the specific icon represents a user content type;
the plurality of second content items respectively represents a plurality of second users; and
incorporating the specific second content item into the first content item comprises incorporating a profile image and a name of a specific second user represented by the specific second content item into the first content item.

19. The system of claim 15, wherein:
the specific icon represents a location content type;
the plurality of second content items respectively represents a plurality of locations; and
incorporating the specific second content item into the first content item comprises incorporating a map showing a specific location represented by the specific second content item into the first content item.

20. The system of claim 15, wherein:
the specific icon represents an image content type;
the plurality of second content items respectively represents a plurality of image; and
incorporating the specific second content item into the first content item comprises incorporating a specific image represented by the specific second content item into the first content item.

* * * * *